United States Patent
Shuai et al.

(10) Patent No.: US 9,487,712 B2
(45) Date of Patent: Nov. 8, 2016

(54) METHOD FOR PRODUCING LIQUID HYDROCARBON FUELS DIRECTLY FROM LIGNOCELLULOSIC BIOMASS

(75) Inventors: Li Shuai, Madison, WI (US); Xuejun Pan, Fitchburg, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 354 days.

(21) Appl. No.: 13/883,755

(22) PCT Filed: Nov. 8, 2011

(86) PCT No.: PCT/US2011/059721
§ 371 (c)(1),
(2), (4) Date: Jul. 2, 2013

(87) PCT Pub. No.: WO2012/064701
PCT Pub. Date: May 18, 2012

(65) Prior Publication Data
US 2013/0305594 A1 Nov. 21, 2013

Related U.S. Application Data

(60) Provisional application No. 61/411,388, filed on Nov. 8, 2010.

(51) Int. Cl.
C10L 1/00 (2006.01)
C10G 3/00 (2006.01)
C10L 1/04 (2006.01)

(52) U.S. Cl.
CPC . *C10G 3/50* (2013.01); *C10G 3/47* (2013.01); *C10G 3/48* (2013.01); *C10L 1/04* (2013.01); *C10G 2300/1011* (2013.01); *C10G 2300/1014* (2013.01); *C10G 2300/44* (2013.01); *Y02E 50/16* (2013.01); *Y02P 30/20* (2015.11)

(58) Field of Classification Search
CPC ............ C10G 3/47; C10G 3/48; C10G 3/50; C10G 2300/1011; C10G 2300/1014; C10G 2300/44; C10L 1/04; Y02E 50/16
See application file for complete search history.

(56) References Cited

U.S. PATENT DOCUMENTS

| | | | |
|---|---|---|---|
| 4,681,936 A | 7/1987 | Pfaff et al. | |
| 5,730,837 A * | 3/1998 | Black et al. | 162/16 |
| 7,572,925 B2 | 8/2009 | Dumesic et al. | |
| 7,671,246 B2 | 3/2010 | Dumesic et al. | |
| 7,880,049 B2 | 2/2011 | Dumesic et al. | |
| 8,324,376 B2 | 12/2012 | Binder et al. | |
| 8,440,870 B2 * | 5/2013 | Sen et al. | 585/14 |
| 2008/0033187 A1 | 2/2008 | Zhao et al. | |
| 2009/0124839 A1* | 5/2009 | Dumesic et al. | 585/251 |
| 2010/0004437 A1* | 1/2010 | Binder et al. | 536/124 |
| 2010/0170504 A1 | 7/2010 | Zhang | |

OTHER PUBLICATIONS

Amiri et al. (Oct. 2010) "Production of Furans from Rice Straw by Single-Phase and Biphasic Systems," *Carbohydr. Res.* 345(15):2133-8.

(Continued)

*Primary Examiner* — Cephia D Toomer
(74) *Attorney, Agent, or Firm* — Lathrop & Gage LLP

(57) ABSTRACT

A process that directly converts carbohydrates, particularly biomass derived carbohydrates and more specifically biomass (e.g., lignocellulosic biomass), to furfural-/HMF-ketone adducts for liquid hydrocarbon production under mild conditions.

24 Claims, 19 Drawing Sheets

(56) References Cited

OTHER PUBLICATIONS

Barrett et al. (2006) "Single-reactor process for sequential aldol-condensation and hydrogenation of biomass-derived compounds in water," *Appl. Catal. B.* 66:111-118.
Binder et al. (Jan. 2009) "Simple Chemical Transformation of Lignocellulosic Biomass into Furans for Fuels and Chemicals," *J. Am. Chem. Soc.* 131:1979-1985.
Binder et al. (Mar. 2010) "Fermentable sugars by chemical hydrolysis of biomass," *Proc. Natl. Acad. Sci. USA.* 107:4516-4521.
Bond et al. (Feb. 2010) "Integrated Catalytic Conversion of γ-Valerolactone to Liquid Alkenes for Transportation Fuels," *Science.* 327:1110-1114.
Chheda et al. (2007) "An overview of dehydration, aldol-condensation and hydrogenation processes for production of liquid alkanes from biomass-derived carbohydrates," *Catalysis Today.* 123:59-70.
Chheda et al. (2007) "Liquid-phase catalytic processing of biomass-derived oxygenated hydrocarbons to fuels and chemicals." *Angewandte Chem., Int. Ed.* 46(38):7164-7183.
Chheda et al. (2007) "Production of 5-hydroxymethylfurfural and furfural by dehydration of biomass-derived mono- and poly-saccharides," *Green Chemistry.* 9:342-350.
Huber et al. (2005) "Production of Liquid Alkanes by Aqueous-Phase Processing of Biomass-Derived Carbohydrates," *Science.* 308:1446-1450.
Huber et al. (2006) "An overview of aqueous-phase catalytic processes for production of hydrogen and alkanes in a biorefinery," *Catalysis Today.* 111:119-132.
Huber et al. (2006) "Synthesis of Transportation Fuels from Biomass: Chemistry, Catalysts, and Engineering," *Chemical Reviews.* 106:4044-4098.
International Preliminary Report on Patentability corresponding to International Patent Application No. PCT/US2011/059721, issued May 14, 2013.
International Search Report with Written Opinion corresponding to International Patent Application No. PCT/US2011/059721, mailed Apr. 10, 2012.
Mascal et al. (2008) "Direct, High-Yield Conversion of Cellulose into Biofuel," *Angewandte Chem., Int. Ed.* 47:7924-7926.
First Office Action corresponding to related Chinese Patent Application No. 201180064503X, issued May 23, 2014—English translation.
Second Office Action corresponding to related Chinese Patent Application No. 201180064503X, issued May 23, 2014—English translation.
Third Office Action corresponding to related Chinese Patent Application No. 201180064503X, issued Jul. 3, 2015—English translation.
Pan et al. (Mar. 2011) "Direct Conversion of Lignocellulosic Biomass to Furan-Based Precursor for Fuel-Grade Hydrocarbon," In; The 24th ACS Meeting. Anaheim, California.
Roman-Leshkov et al. (2006) "Phase modifiers promote efficient production of hydroxymethylfurfural from fructose," *Science.* 312(5782):1933-1937.
Roman-Leshkov et al. (2007) "Production of dimethylfuran for liquid fuels from biomass-derived carbohydrates," Nature. 447:982-985.
van Dam et al. (1986) "The Conversion of Fructose and Glucose in Acidic Media—Formation of Hydroxymethylfurfural," *Starch-Starke.* 38(3):95-101.
Wang et al. (Oct. 2010) "The Applications of Ionic Liquids in Dissolution and Separation of Iignocellulose," In; Ch. 4. *Clean Energy Systems and Experiences*. Ed.: Eguchi, Kei. Sciyo.com. pp. 71-84.
West et al. (2008) "Liquid Alkanes with Targeted Molecular Weights from Biomass-Derived Derived Carbohydrates," *ChemSusChem.* 1:417-424.
Zhao et al. (2007) "Metal chlorides in ionic liquid solvents convert sugars to 5-hydroxymethylfurfural," *Science.* 316(5831):1597-1600.

\* cited by examiner

R: -CH₂OH or -H

METHOD FOR PRODUCING LIQUID HYDROCARBON FUELS DIRECTLY FROM LIGNOCELLULOSIC BIOMASS

CROSS-REFERENCE TO RELATED APPLICATIONS

This application is a U.S. National Stage application of international application PCT/US2011/059721, filed in English on Nov. 8, 2011, which designates the United States, and which claims the benefit of U.S. provisional application 61/411,388, filed Nov. 8, 2010. Each of these applications is incorporated by reference herein in its entirety.

STATEMENT REGARDING FEDERALLY SPONSORED RESEARCH OR DEVELOPMENT

This invention was made with government support under 11-CRHF-0-6055 awarded by the USDA/NIFA. The government has certain rights in the invention.

BACKGROUND OF THE INVENTION

Production of liquid biofuel from biomass is expected to decrease dependence on traditional fossil fuel, reduce greenhouse gas emissions, and improve rural economies (Hill 2007; Rowe, Chapman et al. 2008; Demirbas 2009). Ethanol is one of the promising liquid fuels derivable from biomass, and it has drawn more attention than other types of liquid fuels.

Production of ethanol through fermentation of sugars is a mature technique in the brewing industry. Starch, which can be readily hydrolyzed chemically or enzymatically into sugars, is an ideal feedstock for first generation bioethanol. However, high production cost and the potential threat to food and animal feed security make starch an unsustainable feedstock for fuel ethanol production. The next generation of fuel ethanol must be produced from inexpensive and abundant cellulose (Smith 2008). However, cellulose in lignocellulosic biomass, such as grasses, crop residues, and wood, is wrapped by hemicellulose and especially by lignin, which makes cellulose far more challenging to hydrolyze than starch. Costly pretreatment of feedstock under severe conditions of high temperature and high pressure is required to remove the recalcitrant lignin and hemicellulose prior to enzymatic saccharification of cellulose (Demirbas 2005).

In addition, the high cost of cellulases, the low efficiency of fermentation of pentoses, high energy consumption in ethanol distillation, as well as long production cycle make cellulosic-derived ethanol economically impracticable compared to fossil fuels at this time. Furthermore, the low heating value and water absorbency of ethanol make it a less than ideal substitute for gasoline (Yoon, Ha et al. 2009). These art-recognized problems with fuel ethanol have been the driving force of developing third generation biofuels from biomass. For example, the conversion of biomass into liquid hydrocarbons, which have the same physiochemical properties as traditional fossil fuels, attracts more and more attention (Elliott and Schiefelbein 1989; West, Kunkes et al. 2009).

The generation of liquid hydrocarbons (e.g., gasoline, diesel, and jet fuel) from biomass has great benefit and potential. For example, hydrocarbons have an overall energy efficiency of 2.1 (ratio of the heating value of alkanes to the energy required to produce the alkanes), compared to that of bio-ethanol of 1.1-1.3 (Huber and Dumesic 2006). In addition, bio-hydrocarbons will have a lower production cost than bio-ethanol, due to limited water used for processing, the shorter production cycle, and the elimination of cost- and energy-intensive distillation. The resulting hydrocarbon fuels are the same as traditional fossil fuels, so that modification of existing distribution infrastructure and vehicle engines is unnecessary. Hydrocarbons from biomass have comparable heating value and gas mileage as gasoline. Hydrocarbons are immiscible with water; therefore, expensive distillation is eliminated. Bio-hydrocarbons are produced chemically rather than by fermentation, so the production time is much shorter. The heterogeneous catalysts used in bio-hydrocarbon production can function at higher feedstock concentrations compared to yeast (or other microorganisms) used for bio-ethanol production. Catalysts used in chemical conversion can be completely recycled by simple filtration and reused, while the recovery of enzymes and microorganisms in bio-ethanol production is expensive and incomplete. In addition, because most sugar and sugar derivatives are water soluble, the reactions can be conducted in aqueous solution, allowing ready separation of final hydrophobic products from water (Huber and Dumesic 2006).

Several pathways are currently under investigation to convert biomass into liquid hydrocarbon fuels, for example: (1) biomass gasification (to syngas) followed by Fischer-Tropsch synthesis; (2) biomass pyrolysis (to bio-oil) followed by cracking and upgrading; (3) dehydration of oxygenates from biomass using multifunctional heterogeneous catalysts followed by hydrogenation; (4) depolymerization followed by hydrogenation of lignin; and (5) decarboxylation and chain extension of alkyl carboxyl acids such as levulinic acid derived from hexoses.

Of these approaches, dehydration and hydrogenation of oxygenates derived from biomass saccharides have garnered considerable interest for hydrocarbon production. Extensive work has been done on saccharide-derived hydrocarbons via hydrogenation/dehydration of sugar derivatives, such as hydroxymethylfurfural (HMF) and furfural. A method for directly converting six carbon sugars into hexane using a bifunctional catalyst was reported (Huber, Cortright et al. 2004). Hydrocarbons with carbon chain longer than five or six carbons can be prepared through aldol-condensation of furfural/HMF and acetone. Condensation of acetone with HMF is able to extend the carbon number of the resulting hydrocarbon up to 20, which is very similar to the composition of gasoline and jet fuel (Chheda, Huber et al. 2007). A potential problem with such methods is low yield and selectivity, HMF and furfural tend to polymerize and form insoluble humin in acidic aqueous solution (Vandam, Kieboom et al. 1986) and further degradation of HMF to levulinic and formic acids.

Many studies have been conducted to improve the selectivity of conversion of sugars into furans, i.e., furfural and HMF. For example, the organic solvent dimethyl sulfoxide (DMSO) was used to replace water, and the water-free environment was reported to promote the dehydration of glucose into HMF (Amarasekara, Williams et al. 2008). In another study, methyl isobutyl ketone (MIBK) was added to the reaction as an extraction solvent to collect HMF in situ as it was produced (Roman-Leshkov, Chheda et al. 2006). The HMF formed was immediately extracted into the organic MIBK layer, which largely reduced the opportunity of the polymerization/condensation of HMF into insoluble humin.

It was reported (Zhao, Holladay et al. 2007) that HMF could be produced at high yield and high selectivity from fructose, glucose, and cellulose using ionic liquid as solvent with chromium halide as catalyst. See also U.S. published patent application 2008/0033187. The problems with this method are that ionic liquid can be expensive and difficult to recover, and that chromium halide is potentially toxic to the environment. Partial replacement of ionic liquid with traditional cellulose solvent was also investigated (Binder and Raines 2009) with high conversion yield up to 90% reported from monosaccharide and pure cellulose. See also U.S. published patent application 2010/0004437 (Jan. 7, 2010).

One way to produce hydrocarbons with extended chain length from sugars is through aldol-condensation of furfural compound and acetone (see Chheda, Huber et al. 2007 and Huber et al. 2005). Chheda and Dumesic 2007 report a process in which dehydration of carbohydrate feedstock in a two phase solvent system (water/DMSO or water/1-methyl-2-pyrrolidinone (NMP) with MIBK as extraction solvent) to produce HMF, and a second step of aldol condensation of HMF and acetone with various mixed metal base catalysts, including Mg—Al oxides, followed by hydrogenation of the aldol condensation products. The reference also discusses the use of a Pd/MgO—$ZrO_2$ catalyst (Barrett et al. 2006) for combined aldol-condensation and hydrogenation to form liquid fuels. U.S. Pat. Nos. 7,572,925, 7,671,246 and 7,880,049 relate to methods for making liquid alkanes via aldol condensation products from carbohydrate feedstock. These patents report the use of self aldol or crossed aldol condensation of carbonyl compounds, particularly those derived from biomass, employing a catalyst comprising magnesium, zirconium and oxygen, e.g., MgO—$ZrO_2$. These patents also report dehydration/hydrogenation reactions of such aldol condensation products with bifunctional catalysts which comprise metals (Pt or Pd) supported on acidic supports, such as $SiO_2$—$Al_2O_3$. Each of the forgoing references are incorporated by reference herein in its entirety for descriptions of art-known aldol-condensation process, hydrogenation, dehydration and hydrodeoxygenation methods and art-known methods for producing liquid fuels.

While the art provides certain methods for the production of liquid biofuel from biomass, there remains a significant need in the art for improved production methods which result in increased efficiency, lower cost or both.

SUMMARY OF THE INVENTION

The invention provides a process for converting a feedstock containing a carbohydrate to furfural-/HMF-ketone adducts for liquid hydrocarbon production. More specifically, the feedstock comprises monosaccharides, oligosaccharides, polysaccharides or mixtures thereof. In a specific embodiment, the feedstock is biomass or is derived from biomass. In another embodiment, the feedstock further comprises lignin. The process can be conducted under mild conditions. No pretreatment is required for the process as applied to biomass. More specifically, the process employs a ketone (or mixture thereof) as solvent in the presence of a bromide or chloride salt, acid and water. In specific embodiments the ketone is acetone. In specific embodiments, the volume ratio of ketone to water ranges from 100:1 to 1:1 and more specifically ranges from 20:1 to 5:1 and yet more specifically ranges 15:1 to 7.5:1. Acid includes mineral acids and certain strong organic acids. In specific embodiments, the weight ratio of salt to biomass feedstock ranges from 0.5:1 to 5:1 or from 1:1 to 4:1 or from 2.5 to 1 to 3:1. In specific embodiments, the wt % of acid in the reaction (with respect to solvent) ranges from 0.10 to 4, and more specifically from 0.25 to 2. The process can be conducted at temperatures ranging from 85 to 160° C. and more specifically from 100 to 140° C.

Feedstock (substrate) loading can generally range from about 1% wt/volume to about 50% wt/volume where the volume is the total liquid volume of solvent (e.g., ketone and water) and acid. In specific embodiments, feed stock loading ranges from 3-20% wt/volume or 7-15 wt %/volume.

Biomass generally can be converted by the inventive process. More specifically, biomass includes among others monomeric saccharides, polymeric saccharides (e.g. cellulose and starch), mixtures of monomeric and polymeric saccharides, agricultural crop residue (e.g., corn stover), energy crops (e.g., switchgrass), and forest biomass (e.g., woody plants, wood, hardwood, softwood) and mixtures thereof.

The process of this invention as applied to biomass integrates hydrolysis of polysaccharides present in the biomass, including both cellulose and hemicellulose, to monosaccharides, dehydration of the monosaccharides to HMF and furfural and aldol condensation of HMF and furfural with ketone into a single step process to produce furfural-/HMF-acetone adducts. The furfural-/HMF-ketone adducts from the process can be hydrogenated to hydrocarbons, particularly those with chain lengths in the range of C5 to C21, C6 to C15, or C8-C16.

Lignin in biomass treated by the HDA process can be significantly depolymerized during the process to significantly lower its molecular weight (e.g., Mw 1000 and Mn 250), to render it soluble in various solvents including acetone, dioxane, DMSO and acetic acid. HDA-processed lignin can be employed for the production of co-products as is known in the art. In specific embodiments, at least a portion of the lignin present in biomass treated by the process of this invention is depolymerized during the process and becomes soluble in the ketone. Dissolved lignin can be separated from the ketone solvent and employed for production of co-products as is known in the art. More specifically, lignin dissolved in the ketone can be readily separated from unreacted biomass and other reaction products and the ketone-soluble lignin portion can isolated by solvent removal.

In the processes of this invention, solvent and/or bromide or chloride salt can be optionally recycled for reuse.

In specific embodiments, the salt is an alkali or alkaline-earth metal bromide, particularly LiBr. In specific embodiments, the salt is lithium chloride or lithium bromide. In specific embodiments, the salt is a bromide or chloride of calcium, sodium, zinc, or magnesium. In specific embodiments, the biomass is lignocellulosic biomass. In specific embodiments, the biomass contains 10% or more by weight lignin or 20% or more by weight lignin. In specific embodiments, the acid is mineral acid. In specific embodiments the acid is hydrochloric acid.

The invention also provides a method for making hydrocarbon fuels, particularly liquid hydrocarbon fuels, comprising the steps of (1) forming furfural-/HMF-ketone adducts, particularly acetone adducts, by contacting biomass with a chloride or bromide salt, acid, ketone and water and (2) at least partial hydrogenating and/or dehydrating (hydrodeoxygenation) the furfural-/HMF-ketone adducts. The process of step (1) is typically conducted to achieve conversion yield of 80% or higher, more specifically to achieve conversion yield of 90% or higher, yet more specifically to achieve conversion yield of 95% or higher. In specific embodiments, step (1) can be conducted at temperatures ranging from 85 to 160° C. or more specifically at temperatures ranging from 100 to 140° C. In an embodiment, the ketone is acetone, butanone or pentanone. In an embodiment, the salt can be LiCl or LiBr. In an embodiment, the acid is a mineral acid. The ketone adducts of the HDA process can be dehydrated and hydrogenate to have a selected level of oxygenation and/or saturation by methods that are known in the art. In a specific embodiment, the ketone adducts are substantially dehydrated and hydrogenated to hydrocarbons, where substantial hydrodeooxygenation results in product mixtures having less than about 10% by weight oxygen, less than about 5% by weight or less than 1% by weight oxygen. In other specific embodiments, the ketone adducts are partially hydrodeoxygenated to reduce the oxygenation of the product mixture, such that the mixture is soluble in oxygenated fuels, such as ethanol-gasoline blends. Partial hydrodeoxygenation is conducted, for example, to reduce oxygen in the product mixture to less than 30% by weight, more specifically to between 20-30% by weight oxygen, to less than 25% by weight oxygen or more specifically to between 20-25% by weight oxygen.

The invention also provides a method for generating a ketone-soluble lignin portion which comprises (1) the step of contacting biomass containing lignin with one or more ketones in the presence of a bromide or chloride salt, acid and water, separating the ketone solution containing lignin and removing ketone solvent therefrom to generate ketone-soluble lignin. In an embodiment, the step can be conducted at temperatures ranging from 85 to 160° C. or more specifically at temperatures ranging from 100 to 140° C. In an embodiment, the ketone is acetone. In an embodiment, the salt can be LiCl or LiBr. In an embodiment, the acid is a mineral acid. In a related embodiment, the invention also provides a method for providing a $CH_2Cl_2$-soluble lignin fraction which is obtained by contacting ketone-soluble lignin with $CH_2Cl_2$, removing insoluble material and removing $CH_2Cl_2$ to generate $CH_2Cl_2$-soluble lignin.

In a specific embodiment, the $CH_2Cl_2$-soluble lignin which contains monomers, dimers and other relatively low molecular weight components can be hydrodeoxygentated using methods as described herein or as are known in the art.

The invention also provides at least partially depolymerized lignin generated as insoluble residue by reacting biomass, particularly wood powder and wood chips, by the methods of this invention. The invention further provides at least partially hydrodeoxygenated lignin fractions in which the weight % of oxygen is less than 30%, is less than 25 or is less than 20%.

It is noted that the following may contain discussion of the mechanism of the reactions described herein. This discussion represents the inventors' current view of the mechanisms and is in no way intended to be limiting with respect to the invention. Additional aspects and embodiments of the invention can be ascertained by review of the following detailed description, figures and non-limiting examples.

BRIEF DESCRIPTION OF THE DRAWINGS

FIG. 8(a)-(f) provides GC-MS of condensation products of $CH_2Cl_2$, from indicated reactions.

FIG. 9(a)-(c) provides ESI-MS of condensation products in $CH_2Cl_2$ from indicated reactions.

DETAILED DESCRIPTION OF THE INVENTION

Figure 1:
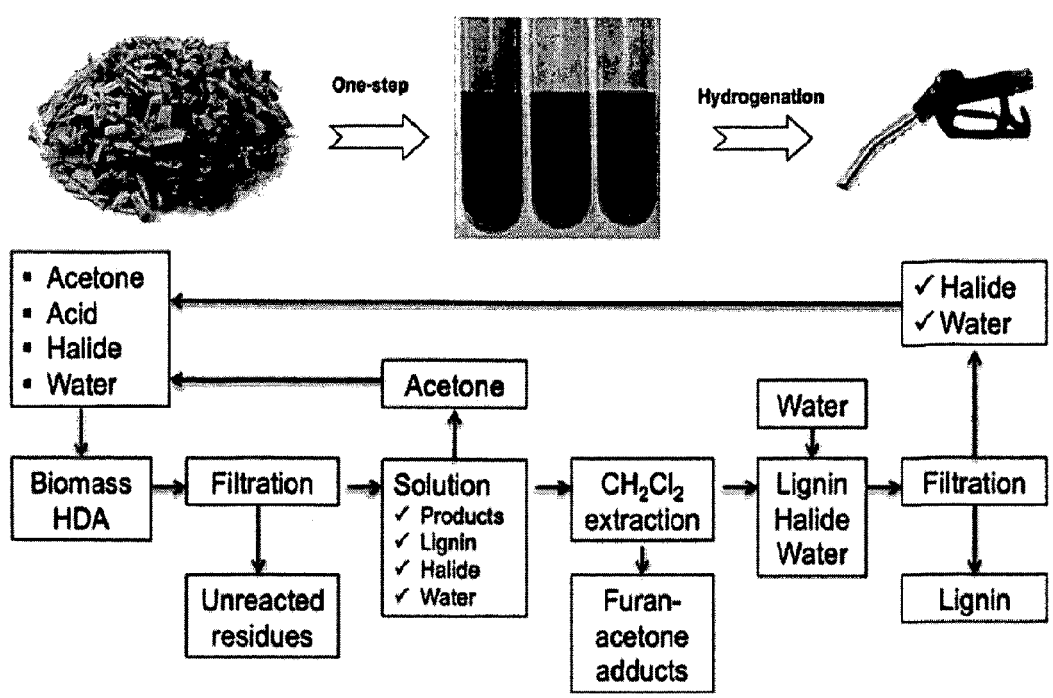
FIG. 1 is a schematic flowchart of the HDA process of the invention.

The present invention relates to a process that directly converts carbohydrates, particularly biomass derived carbohydrates and more specifically biomass (e.g., lignocellulosic biomass) to furfural-/HMF-ketone adducts for liquid hydrocarbon production under mild conditions. In a specific embodiment, the furfural-/HMF-ketone adducts are furfural-/HMF-acetone adducts. The invention further relates to a process for making hydrocarbon fuels, particularly those hydrocarbon fuels which contain hydrocarbons having 5-15 or 8-15 carbon atoms by hydrodeoxygenation of furfural-/HMF-ketone adducts.

Using a ketone, particularly acetone, as solvent in presence of a salt, particularly a bromide or chloride salt of an alkaline earth, alkali metal or certain other metals and a relatively small amount of acid (mineral acid or certain organic acids) and water, the process integrates the hydrolysis of polysaccharides (both cellulose and hemicellulose) to monosaccharides, dehydration of the monosaccharides to HMF (from hexoses) and furfural (from pentoses), and aldol condensation of HMF and furfural with ketone (particularly acetone) into a single step to produce furfural-/HMF-acetone adducts. The process is herein abbreviated as HDA (Hydrolysis-Dehydration-Aldol condensation). The furfural-/HMF-acetone adducts from the process can be readily hydrogenated to hydrocarbons, particularly those with chain length in the range of C5-C21 by art known methods. In a related embodiment, the ketone adducts generated by the HDA process can be partially hydrodeoxygenated to decrease oxygen content and/or decrease unsaturation, and generate product mixtures that are soluble in oxygenated fuels, such as ethanol-gasoline blends. Such partially hydrodeoxygenated mixtures are useful as oxygenated fuel additives.

The feedstock of the invention comprises monosaccharides (e.g., glucose, fructose etc.), oligosaccharides (e.g., sucrose, cellobiose, etc.) or polysaccharides (cellulose, hemicellulose, xylan, mannan, arabinan, starch, etc.) or mixtures thereof. The feedstock can be biomass which includes plant materials, crops, energy crops (crops intended for conversion to fuel such as switchgrass, *Miscanthus giganteus*, etc.), agricultural residue (e.g., corn stover, sugar cane bagasse), paper waste (e.g., newsprint) and hard or soft wood or wood residue (wood chips, wood powder saw dust). Feedstock can be pre-treated by physical methods, such as grinding, chopping or mashing. Feedstock can be pre-treated by various chemical or biological methods known in the art. Such chemical or biological pre-treatments are not however, required. Wood materials are preferably chopped or grounds to form chips or powders.

The term ketone is used generally herein and specifically includes ketones which contain 3-10 carbon atoms and particularly those containing 3 to 6 carbon atoms. Of particular interest are alkyl ketones, e.g., C3-C8 alkyl ketones, acetone, propanone, butanone, methyl ethyl ketone and the like. Ketone can be a mixture of one or more ketones in particular can be a mixture of acetone with one or more other ketones. In a specific embodiment, the use of ketones having sufficient water solubility, at least at the reaction temperature and pressure, such that the reaction solvent is one phase is preferred. In a specific embodiment, the ketone is water-miscible at the reaction temperature.

Various inorganic and organic acids can be employed in the HDA process. Preferred acids are mineral acids including among others HCl, $HNO_3$, $H_2SO_4$, $H_3PO_4$, $H_3BO_3$, and mixtures thereof. Strong organic acids, including formic acid can be employed. Solid acids may be employed for certain feedstocks. Liquid acids are, however, preferred for use in the reactions herein, particularly for reactions where the feedstock is biomass Ketone adducts formed by the process of this invention can be dehydrated and/or hydrogenated by art-known methods. In a specific embodiment, the ketone adducts of this invention are hydrodeoxygenated employing a supported metal catalyst as described in U.S. Pat. No. 7,572,925, 7671,246 or 7,880,049.

Supported metal catalyst useful in the methods herein include among others Pt, Pd, Ru, Ni, Fe, Cu, Rh, Co, mixtures thereof or their alloys supported on a solid acid such as $Al_2O_3$, $SiO_2$—$Al_2O_3$, $Zr_2O$, Zeolite catalyst, $NbPO_5$, $Nb_2O_5$ or other solid acid which can dehydrate to form a double bond. In specific embodiments, the hydrodeoxygenation catalyst is Pt, Pd or mixtures or alloys thereof supported on a solid acid. In a more specific embodiment, the solid acid upon which the metal is supported is $SiO_2$—$Al_2O_3$. In another more specific embodiment, the hydrodeoxygenation catalyst is Pt, Pd or a mixture thereof supported on $SiO_2$—$Al_2O_3$ Additionally, lignin which is present in the biomass is depolymerized by the HDA process. The residual insoluble lignin, particular from HDA reaction of wood chips or powder can be employed for generation of co-products as is known in the art and can be at least partially hydrodeoxygenated to generate oxygenated fuel additives. At least a portion of residual lignin is soluble in the ketone used in the HDA process. The lignin fraction dissolved in the ketone can be readily separated from the unreacted biomass and other products and the ketone-soluble lignin portion can be obtained by solvent removal. This ketone-soluble lignin portion can be employed for production of coproducts as is known in the art. The HDA process can also be used to generate a $CH_2Cl_2$ (methylene chloride)-soluble lignin fraction as described herein below. This $CH_2Cl_2$-soluble lignin fraction can also be employed for production of co-products as is known in the art and can be hydrodeoxygenated to generated hydrocarbon fuels.

Solvent soluble lignin fractions produced by the HDA method herein, such as the ketone-soluble lignin fraction, and more specifically the acetone-soluble or the $CH_2Cl_2$-soluble lignin fractions can be used in a manner similar to organosolv lignin, in adhesives, polyurethane, polymeric composites, and fiber precursors to lignin-based carbon fibers. See: Kubo and Kadla 2005; Kubo and Kadla 2004; Lora and Glasser 2002, each of these references is incorporated by reference herein in its entirety as examples of applications of lignin fractions.

The ketone and salt used in the HDA process can be recycled and reused.

A more detailed description of parameters (temperature, catalysts loading, and reaction time) of the HDA process are provided herein below. The furfural-/HMF-ketone adducts generated by the HDA process (specifically those of acetone) were quantitatively and qualitatively investigated using GC-MS, ESI-MS and 2D-NMR ($^1H$—$^{13}C$). Partial hydrodeoxygenation of product mixtures was examined.

Although not wishing to be bound by any particular mechanism of action, the reaction mechanism of the new process was elucidated through a kinetic study of a model. In addition, depolymerization of lignin was investigated using isolated lignin as a model in dioxane-water using GPC.

The HDA process is schematically illustrated in FIG. 1. Biomass feedstock is fed, along with ketone (e.g., acetone) water, salt, and acid, into an appropriate reactor. Reaction is conducted preferably at 100~140° C. until a desired level of conversion is attained, typically for about 1-4 hours. The HDA process is typically conducted under moderate pressure, e.g., about 80 psi at 120° C. and about 130 psi at 140° C. More generally, reaction can optionally be conducted at pressures ranging from 50-200 psi.

After reaction, unreacted ketone in the final liquor can be recycled through vaporization. The reaction residue, including target products (furfural- and HMF-acetone adducts), salt, acid, and water is mixed with appropriate extracting solvent (e.g., $CH_2Cl_2$, ethyl acetate, methyl isobutyl ketone, etc.) to extract the adducts. The resulting product suspension is centrifuged to separate the extracting solvent layer from insoluble solid and water. The product adducts can be recovered from the extracting solvent layer by any known methods, for example by evaporating the solvent. The ketone adducts can be readily converted to hydrocarbons (e.g., gasoline or other liquid fuels) through repeated hydrogenation/dehydration using, art-known methods. In a specific embodiment, multifunctional catalysts can be employed for hydrogenation and dehydration. In an alternative process, the ketone adducts can be partially hydrodeoxygenated to reduce the oxygen content or level of unsaturation of the mixture. Resulting products retain some level of oxygenation and can be employed, for example, as additives for oxygenated fuel.

Insoluble solid and water are preferably filtered and the solids are washed with water to allow recycling of acid and salt (e.g., LiBr). The washed insoluble solid can be filtered to produce ketone-soluble lignin. Alternatively washed insoluble solid can be dissolved in methylene chloride and filtered to produce $CH_2Cl_2$-soluble lignin. Residual lignin (insoluble and solvent-soluble fractions) can be hydrogenated and dehydrated employing art known methods to reduce the oxygen content and the unsaturation level thereof.

Figure 2:
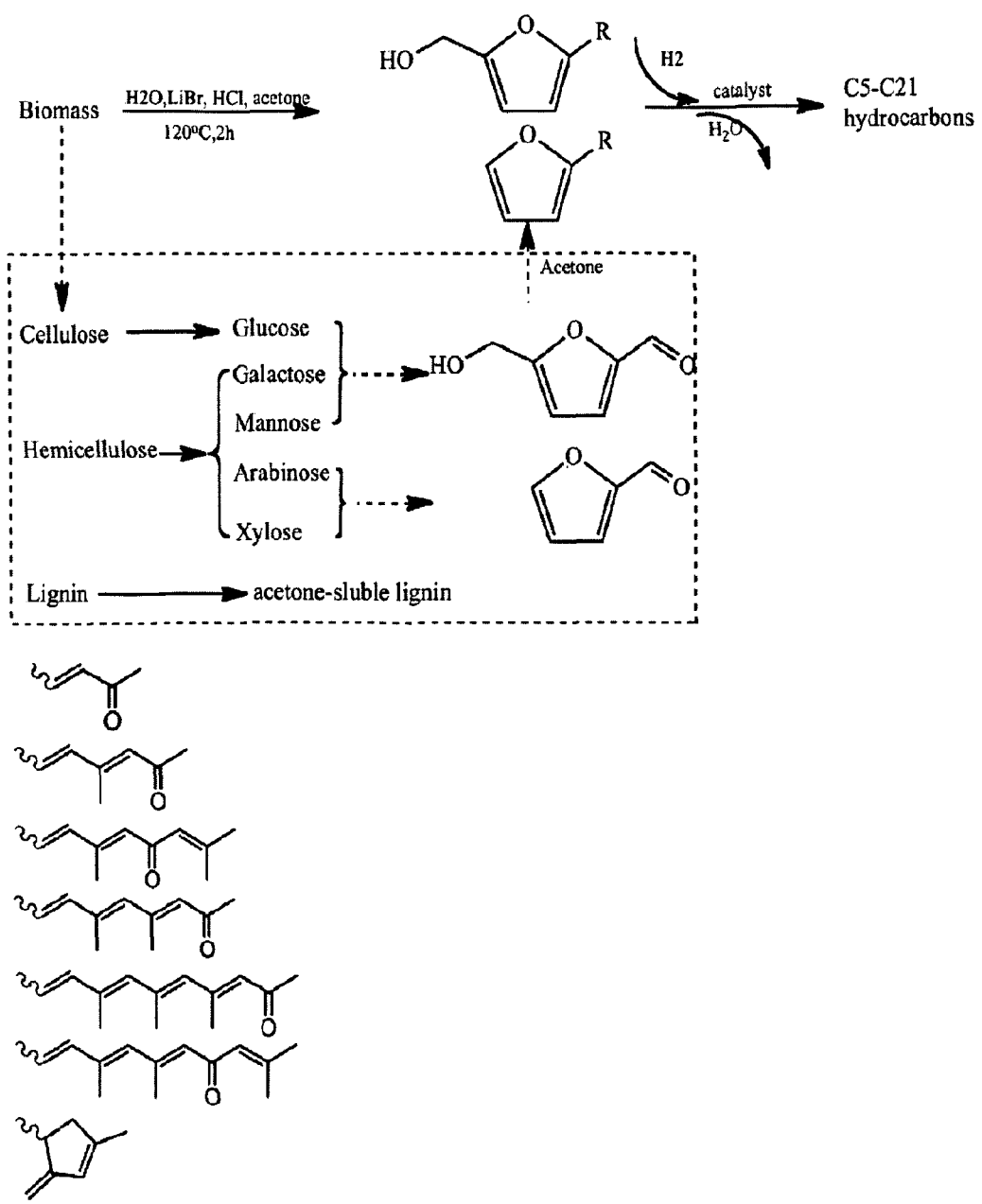
FIG. 2 is a scheme illustrating the reaction pathway for reaction of biomass in acetone-water with LiBr and mineral acid catalyst.

Proposed chemical pathways of the HDA process are summarized in FIG. 2. The hydrolysis of polysaccharides in biomass (cellulose and hemicellulose) to monomeric saccharides (glucose, galactose, mannose, arabinose, and xylose), dehydration of the saccharides to furfural (from pentoses) and HMF (from hexoses), and the aldol-condensation of furfural and HMF with acetone to furfural- and HMF-acetone adducts are completed in a single integrated step. In the same step, lignin is catalytically degraded and dissolved in ketone. If desired, the ketone soluble lignin can be collected and employed for production of co-products as is known in the art.

Furfural-/HMF-ketone adducts of this invention can be converted into hydrocarbons by hydrogenation or combined dehydration/hydrogenation as is known in the art. For example using methods as described in Hubber et al. (2005) Science 308:1446-1450 and West et al. (2008) Chem Sus Chem 1(5):417-424 can be employed. Each of these references is incorporated herein in its entirety for description of art-known methods of hydrogenation of ketone adducts to form hydrocarbons.

Figure 3:
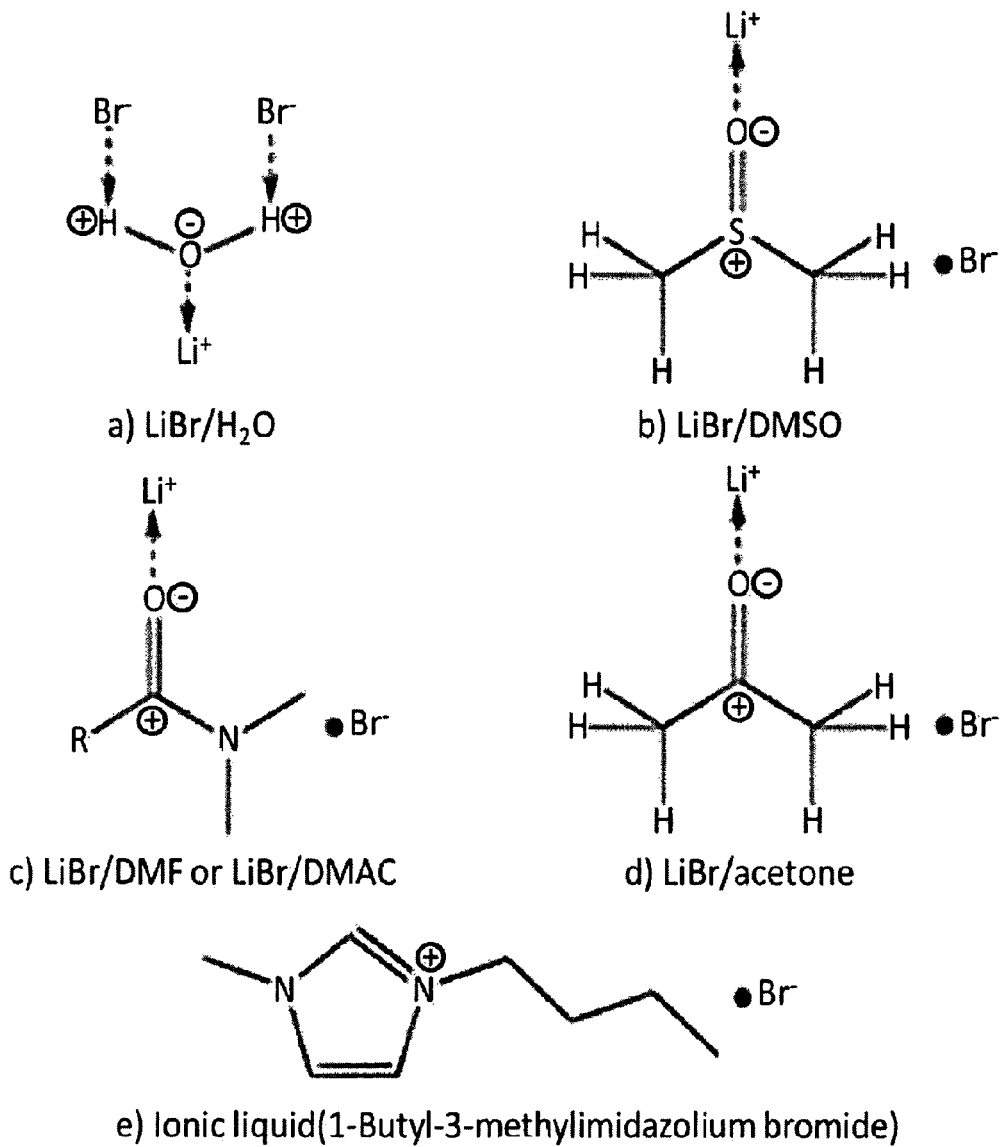
FIG. 3 illustrates the interaction mechanism of LiBr with different solvents, where a: LiBr in $H_2O$; b: LiBr in DMSO; c: LiBr in DMF or DMAC; d: LiBr in acetone; and e: ionic liquid (1-butyl-3-methylimidazolim bromide.

The interaction of LiBr with different solvents is illustrated in the structures of FIG. 3. In aqueous solution, both $Li^+$ and $Br^-$ are solvated by water molecules (FIG. 3a), which not only separates $Li^+$ and $Br^-$, but also inhibits $Br^-$ from attacking positively charged positions. By considering the interaction of LiBr with traditional cellulose solvents LiBr/DMSO (FIG. 3b) and LiBr/DMF (FIG. 3c), it can be seen that free halide ion is important for dissolving cellulose by destroying hydrogen bonds in cellulose. Though different from water, the S=O and C=O, of DMSO and DMF, respectively, are similarly polarized, but the positively charged position is not an H atom (as in water), but a S or C atom, in the solvents and therefore no hydrogen bonds can form between solvent molecules. When LiBr is added to these solvents, considering the size difference of $Li^+$ and $Br^-$ as well as the steric constraints of the positively charged position (C or S atom) by neighboring groups, only $Li^+$ is able to coordinate closely with the negatively polarized O, while $Br^-$ is relatively free in the solvent. It is believed that the presence of the free halide ion disrupts the hydrogen bonds and promotes the dissolution of cellulose in ionic liquid (FIG. 3e). However, these cellulose solvents are expensive, toxic, and hard to recover due to high boiling point, which excludes or limits their industrial potential as solvents for directly hydrolyzing lignocellulosic biomass into monosaccharides.

In comparison to these extensively investigated polar aprotic solvents, acetone, the preferred ketone in the methods herein, has similar structure, and as illustrated in FIG. 3d, theoretically can coordinate $Li^+$ and leave $Br^-$ free. In addition, acetone has other advantages over DMSO and DMF for use as a solvent in these processes. Low boiling point makes acetone very easy to separate and recover from the reaction system. Additionally, a ketone solvent, like acetone, can react in situ with newly generated furfural and HMF through aldol condensation to form precursors to liquid hydrocarbons with extended carbon number.

In addition, aldol condensation with the ketone solvent reduces or prevents self-condensation of furfural and HMF which forms undesirable humin. Furthermore, compared to DMSO and DMF, acetone is inexpensive, less toxic, and has low-viscosity. It is also a good solvent of lignin.

Figure 4:
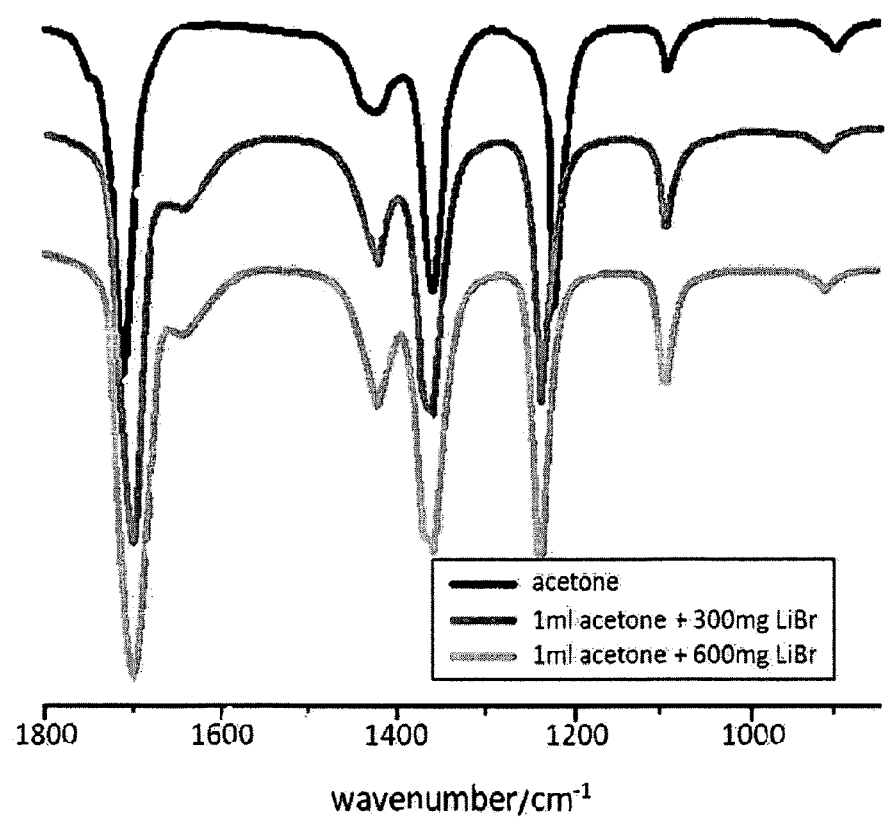
FIG. 4 is a set of Fourier transform infra-red (FTIR) spectra of LiBr in acetone as a function of the concentration of LiBr.
Figure 5:
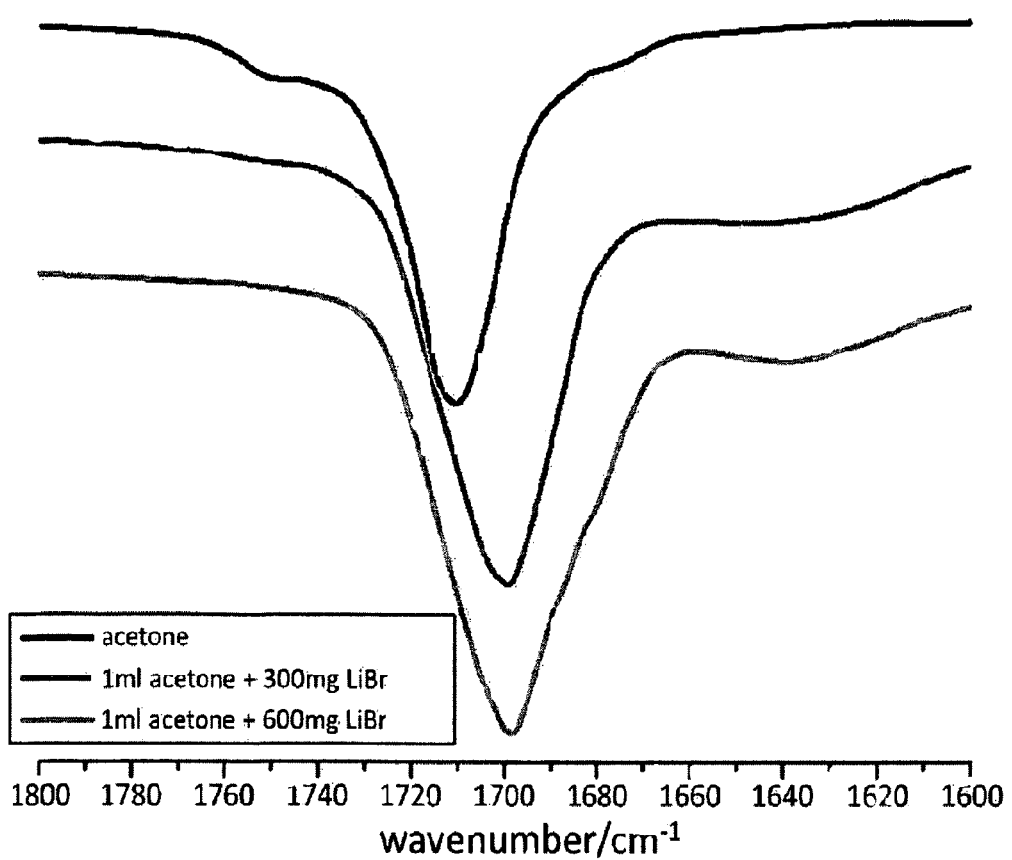
FIG. 5 is a set of FTIR spectra of the C=O stretch of acetone as a function of concentration of LiBr.

In order to verify the proposed interaction between LiBr and acetone and the formation of loosely attached or free $Br^-$, solutions of LiBr in acetone were studied by FTIR. In FIG. 4, the peak at 1715 cm-1 represents the stretching vibration of pure acetone. Because of the interaction of the carbonyl group of acetone with $Li^+$, there is partial electron donation from the C=O bond to $Li^+$, which weakens the C=O bond. This effect is seen in the FTIR spectra as a red shift of the peak to lower wavenumber (FIG. 5). Reduced positive charge on $Li^+$ caused by the electron donation from the C=O bond weakens the attractive force between $Li^+$ and $Br^-$. Thus, loosely attached or free $Br^-$ will be formed in this situation. The free $Br^-$ is believed to act as an effective nucleophile in catalyzing conversion of xylose and glucose to furfural and HMF, respectively.

Different types of feedstock, including monomeric saccharides (glucose, galactose, xylose, arabinose, and mannose), polysaccharides (cellulose and starch), papers (filter paper, newspaper, and printpaper—office paper), and lignocellulose (spruce, poplar, corn stover, and switchgrass), were treated with the HDA process at small scale (100 mg feedstock), and the results are summarized in Table 2.

The first 14 experiments listed in Table 2 were conducted with glucose as feedstock to investigate the effect of LiBr loading and acid dosage on the conversion of glucose. With increased LiBr loading or acid dosage, glucose conversion yield (the percentage of glucose converted to the products) generally increased. However, a turning point was reached at high LiBr (at 300 mg representing a ratio of 3:1 of salt to feedstock). The conversion yields were 70-80%, when LiBr loading was below 300 mg, and when LiBr loading increased above 300 mg, conversion decreased. It is believed that this result is due to a decrease in effectively free $Br^-$ above 300 mg loading probably caused by higher viscosity and formation of humin. At the same dosage of LiBr, higher conversion yield was obtained with higher acid (compare No. 13 to No. 3 in Table 2). But, comparison of No. 4 and No. 14 (Table 2) which both exhibited the same conversion yield even though No. 14 had a higher acid dosage implies that 0.25% acid is sufficient to complete the conversion in spite of faster reaction rate for No. 14. The far lower conversion yields of No. 2 and No. 3 compared to No. 4 indicate that LiBr dosage less than 200 mg might not generate sufficient free $Br^-$ catalyst. As discussed above, in the presence of water, most $Br^-$ ions are solvated by water. About ~70% conversion was observed even without addition of LiBr salt (No. 1) and no HMF was detected in the final liquor, which might be caused by the direct condensation of sugar with acetone to form ketal (Pfaff 1987).

Acid also promoted the formation of acetone condensation products. Comparing No. 2-4 with No. 12-14 (Table 2), at the same LiBr dosage, the latter had much higher glucose conversion yield than the former, indicating that the acid promoted/catalyzed the reaction. In addition, higher acid loading enhanced the consumption of acetone due to self-condensation. In No 11, when no acid was added, little acetone was consumed. In summary, it appears that 300 mg LiBr with 0.25% acid is sufficient to ensure the completion of the reaction of 100 mg glucose.

Other saccharides occurring in lignocellulose, including arabinose, galactose, xylose, and mannose, were studied at the same conditions (300 mg LiBr and 0.25% acid) No. 15-18 in Table 2. The results indicated that these sugars could react similarly to glucose.

In addition to the monomeric saccharides above, the HDA process (similar reaction conditions) was applied to polysaccharides (Nos. 19-21, Table 2) and lignocellulosic biomass (Nos. 22-28, Table 2). Different feedstocks have varying recalcitrance to the reactions, so the acid loading was varied with different feedstock. Conversion yield of 99% was achieved when 0.5% acid was used for microcrystalline cellulose (Avicel) and filter paper. Starch, likely because of its amorphous structure, only needed 0.25% acid for complete reaction. However, xylan needed more acid for completion of reaction probably because of the dry and tough properties of the xylan used. Because the inorganic fillers in print paper and newspaper neutralize acid, more acid needed to be added to achieve above 95% completion of the reaction (1 and 2% acid were used for newspaper and print paper, respectively).

For the lignocellulosic biomass investigated (softwood spruce, hardwood poplar, agricultural residue corn stover, and energy crop switchgrass) 0.5% acid was enough to break down lignin and convert cellulose and hemicellulose into sugars for further reactions.

A/F ratio (molar ratio of consumed acetone to converted glucose or other saccharides) was measured as an indirect estimate of the carbon number of products. If the acetone self-condensation does not change, a higher A/F ratio implies that more acetone molecules are condensed to furfural or HMF, which will give longer carbon chains in final adducts. Conversely, lower A/F ratio implies fewer acetone molecules condensed to furfural or HMF, which will give shorter chain adducts. Although the observed A/F ratio was highly dependent on the conversion yield and acid concentration, it can still be used as an indicator of the extent of acetone condensation to HMF or furfural. For example, generally higher acid concentration (>0.5%) gave an A/F ratio larger than 2, indicating more acetone condensed, while lower acid concentration (0.25%) resulted in an A/F ratio less than 2, indicating that acetone condensation was significantly reduced.

At 300 mg LiBr and 0.5% acid, spruce powder can be smoothly liquefied in 20~30 min. The resulting slurry had low viscosity, when a liquid to solid ratio of 10:1 (v/w) was used, indicating a potential to load more feedstock to improve efficiency. Also, increasing feedstock could decrease the extent of self-condensation of acetone and the A/F ratio because of the reduced chance for acetone molecules to contact each other.

Table 3 shows the result of a 5× scaled-up reaction in which 500 mg of ~0.5 cm small wood chips were used as feedstock. It was observed that the chips gradually became smaller as the reaction proceeded, indicating that reaction of lignocellulosic biomass was a heterogeneous process from outside to inside. However, in this scaled-up reaction, the use of 0.5% acid only resulted in 70% conversion yield, indicating that reaction of wood chips was slower than wood powder. To achieve higher conversion yield, longer reaction time and/or more acid for faster hydrolysis would be preferred. When 1% acid was added, the reaction rate was significantly enhanced and no wood chips were left after a 2-hour reaction.

When the amount of spruce chips was increased from 500 mg to 1500 mg, product yield did not significantly increase with the increased loading. The conversion yield still stayed high, but the A/F ratio decreased. This indicates that the A/F ratio can be adjusted to generally control the carbon number of hydrocarbon chains produced. More specifically, increasing the weight ratio of spruce chips to acetone reduces the A/F ratio, as seen from Nos. 30-32 in Table 3 and may reduce self-condensation of acetone.

Product solutions from different feedstocks were observed to vary in color (data not shown). The control experiment (acetone with LiBr only) resulted in a light brown liquid. The lighter color is from acetone self-condensation products. Reactions containing xylose, glucose, or spruce powder generated dark brown or black product solutions. The color is believed to result from derivatives or condensation products of furfural or HMF. In all cases, the feedstocks were dissolved and formed homogeneous solutions at the end of the reaction.

The success of small-scale, one-step-direct conversion of lignocellulosic biomass into hydrocarbon precursors encouraged us to scale up the reaction. Regular wood chips with size of approximately 1-2 cm and a 1-L Parr reactor were used. The reaction conditions used were the same as in the small-scale reaction, but the starting raw material loading was increased to 10 g with salt (LiBr) loading of 30 g with acetone to water volume ratio of 9:1 at 120° C. for 2 hours with varying acid addition. The pressure of the reaction is about 80 psi at 120° C. and 130 psi at 140° C. Feedstock loading was 10 g/100 mL of solvent. Results are shown in Table 4. It was observed that acid loading had a significant effect on the conversion yield. With the increased size of wood chips, 1% acid loading was not sufficient to completely hydrolyze the wood chips. Increasing the acid loading to 2% could achieve a conversion yield over 93%, but the self-condensation of acetone was significantly promoted at the same time, which can be seen from the jump in the amount of products (Table 4).

To reduce the self-condensation of acetone without affecting the conversion yield, a portion of the acetone was replaced by water, but the total volume of water and acetone was kept the same. Since decreasing the acetone to water ratio could slow down the reaction rate, higher temperature was also used. It can be seen from Table 5 that when the acetone to water ratio was decreased to 50/50, keeping the same feedstock loading (10 g/100 mL) the amount of the products decreased significantly, but not the conversion yield, implying that the acetone self-condensation products were reduced.

Further decreasing the acetone to water ratio significantly hurt the conversion yield. With an acetone to water ratio of 50/50, various lignocellulosic biomasses achieved a good conversion yield up to 90%. However, in these reactions most lignin was left as black colored residue, likely because more water made the process similar to the use of a dilute acid process, leading to significant condensation of lignin. Because lignin is insoluble in water, it precipitated when the acetone content was lowered.

When the pH value of the liquor was adjusted to above 7 with alkali, a precipitate formed representing 10~30% by weight of the feedstock. The precipitate could be redissolved, if made acidic. It is unclear why the precipitate is insoluble in alkaline solution, yet soluble in acidic solution. The composition of the precipitate is unclear. It could contain condensation products of sugars and furan compounds.

The effect of temperature on conversion yield of spruce powder was investigated in the range of 80-120° C. for reaction conditions as listed in Table 6. Results in Table 6 indicated that conversion yield increased with the increasing temperature; however, high conversion yield could also be achieved by extending reaction time at lower temperature, which can be seen from Table 7. For example, conversion yield of spruce powder was only 67% at 100° C. for 2 hours, compared to 100% conversion yield at 120° C. for 2 hours. The conversion yield at 100° C. could be enhanced to 88% at 3 hours and 100% at 4 hours, respectively.

The ability of common and inexpensive halide salts to catalyze the HDA reaction of spruce powder was investigated. Results in Table 8, where conversion yield was measured, indicate that $CaBr_2$, NaBr, LiBr and LiCl gave about the same conversion yield in the same reaction time. On the other hand, other metal halides tested, such as $CaCl_2$, $MgCl_2$, $ZnBr_2$ and $ZnCl_2$ and $FeBr_3$ gave somewhat lower yields. $CuCl_2$ and $FeCl_3$ did not work under the conditions tested. It is currently believed that d orbitals of transition metals ions can still form bonds with halide ion in spite of the presence of the interaction with C=O, which reduces the release of free halide ions. LiI, $AlCl_3$ and KBr did not appear to catalyze the reaction under the conditions employed. The failure of LiI may have been caused by its decomposition into LiOH and iodine. $AlCl_3$ is not an ionic compound and no free $Cl^-$ likely forms in solution. The failure of KBr to catalyze the reaction may be due to the larger size of $K^+$ compared to $Li^+$ and $Na^+$.

Hydrolysis of spruce powder (100 mg) in the presence of LiBr (300 mg) in acetone water (10:1 by volume) at 120° C. and different common mineral acids was investigated. The results are shown in Table 9. It was found that other inorganic acids, such as $H_2SO_4$, $HNO_3$, and $H_3PO_4$, worked as well as HCl. It was also observed that conversion yield decreased with decreasing acidity at the same dosage and reaction time. Reaction proceeded faster when strong acids were added. Formic acid could only convert 54% spruce powder, but it is expected that longer reaction time might be able to get a higher conversion yield. Acetic acid (a relatively weak acid) did not have any observable catalytic effect on the conversion process.

Figure 6:
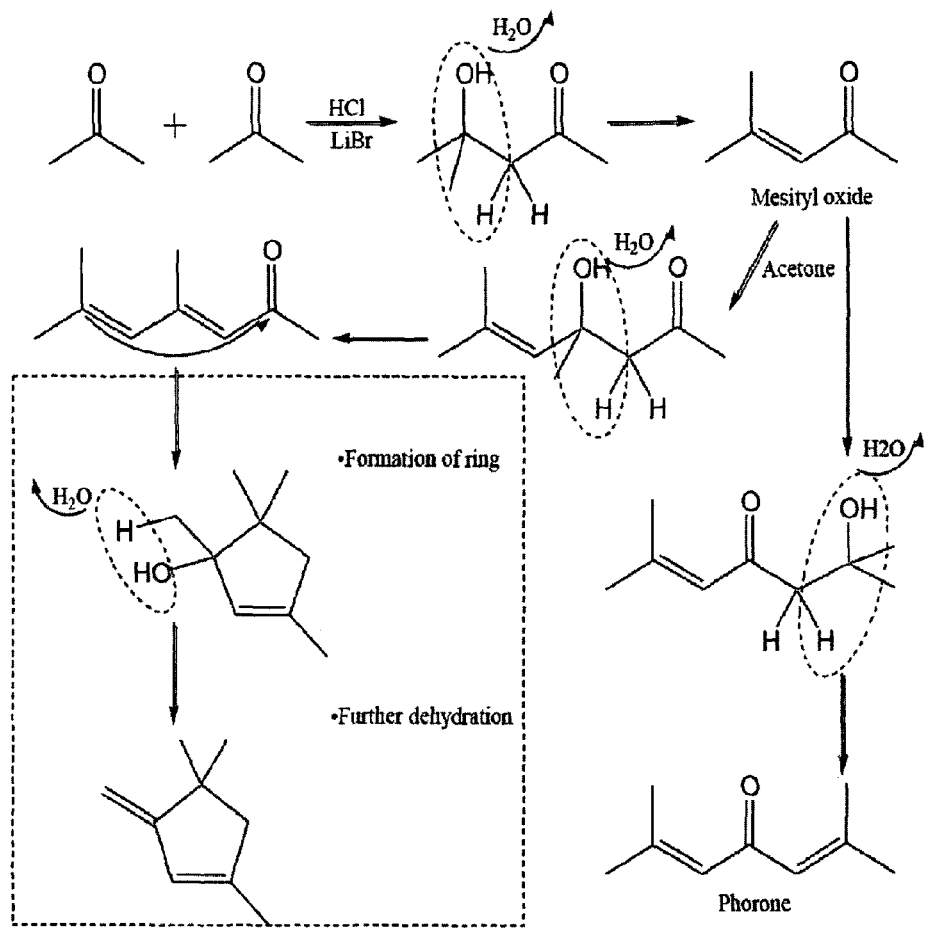
FIG. 6 is a scheme illustrating the proposed self-condensation mechanism of acetone.
Figure 7:
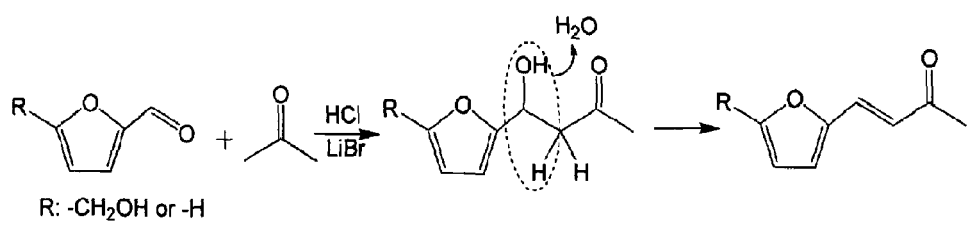
FIG. 7 is a scheme illustrating the proposed condensation mechanism of furfural and HMF with acetone.

GC-MS (Gas Chromatography/Mass Spectrometry) was used to identify products of HDA reaction and verify the proposed reaction pathway. FIGS. 6 and 7 illustrate the mechanisms of acetone self condensation and condensation between furfural/HMF and acetone, respectively. Acetone condensation proceeds with loss of water to branched unsaturated ketones which in turn can cyclize with additional loss of water. From the pathway shown in FIG. 6, it is expected that the molecular weight of acetone self-condensation products should be $(n_1 \times 40)+(n_2 \times 58)$ (where $n_1$, $n_2$=0, 1, 2 . . . ; $n_1$ is the number of condensed acetone molecules with following dehydration; $n_2$ is the number of condensed acetone molecules without following dehydration; $n_1+n_2$ is the total number of condensed acetone molecules) because of possible intermolecular dehydration. Similarly, from FIG. 7, the molecular weight of HMF-acetone condensation products should be $126+(n_1 \times 40)+(n_2 \times 58)$ (where $n_1$, $n_2$=0, 1, 2 . . . ; $n_1$ is the number of condensed acetone molecules with following dehydration; $n_2$ is the number of condensed acetone molecules without following dehydration; $n_1+n_2$ is the total number of condensed acetone molecules), since one HMF molecule is added and dehydration can happen between HMF and acetone. The molecular weight of furfural-acetone condensation products by analogy should be $96+(n_1 \times 40)+(n_2 \times 58)$ (where $n_1$, $n_2$=0, 1, 2 . . . ; $n_1$ is the number of condensed acetone molecules with following dehydration; $n_2$ is the number of condensed acetone molecules without following dehydration; $n_1+n_2$ is the number of condensed acetone molecules). The products of condensation are a mixture of the products from acetone self-condensation and the aldol-condensation between HMF/furfural and acetone of varying molecular weight. Table 10 shows the structures and molecular weights of products of these proposed mechanisms.

Figures 1, 8:
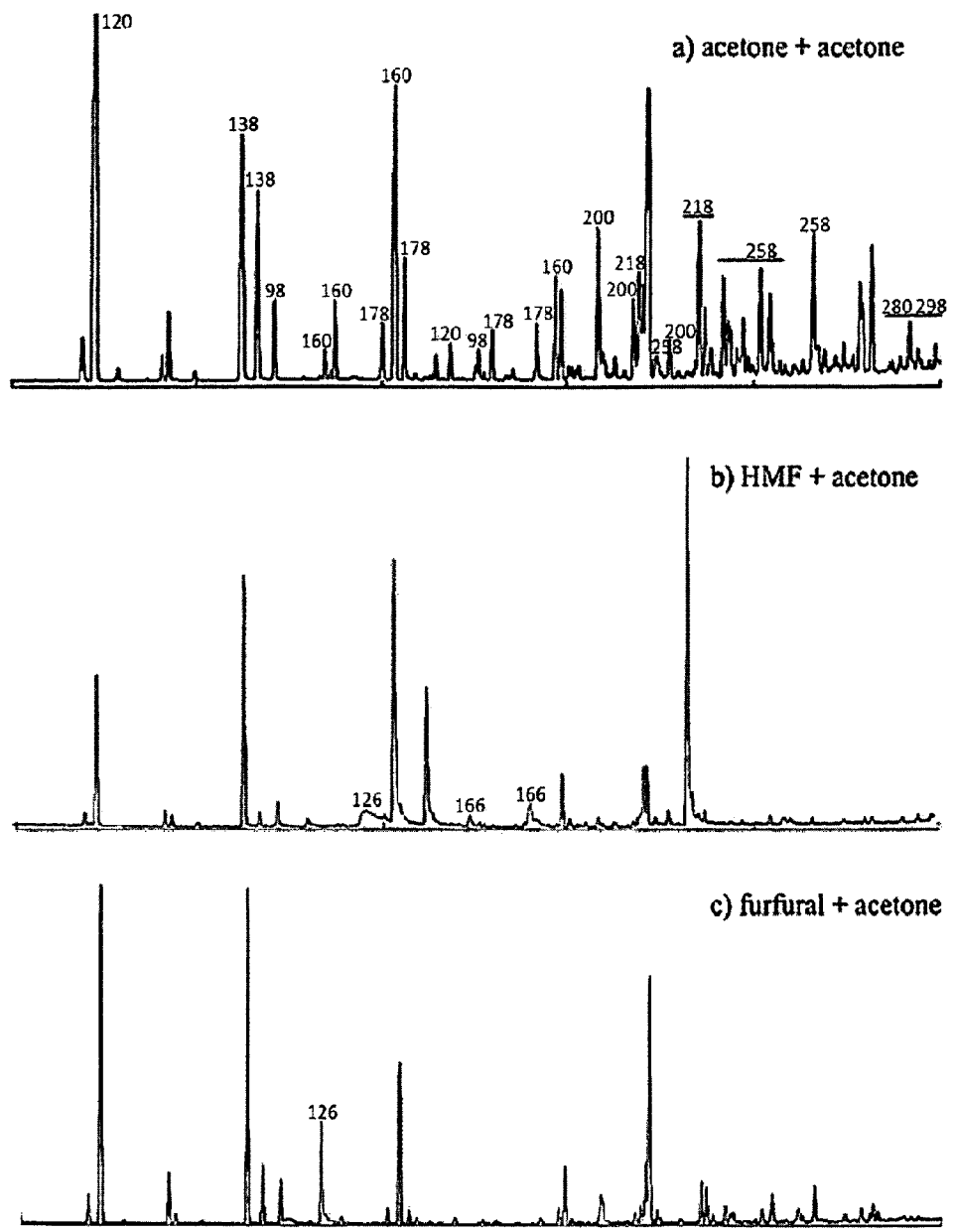
Figures 2, 8:
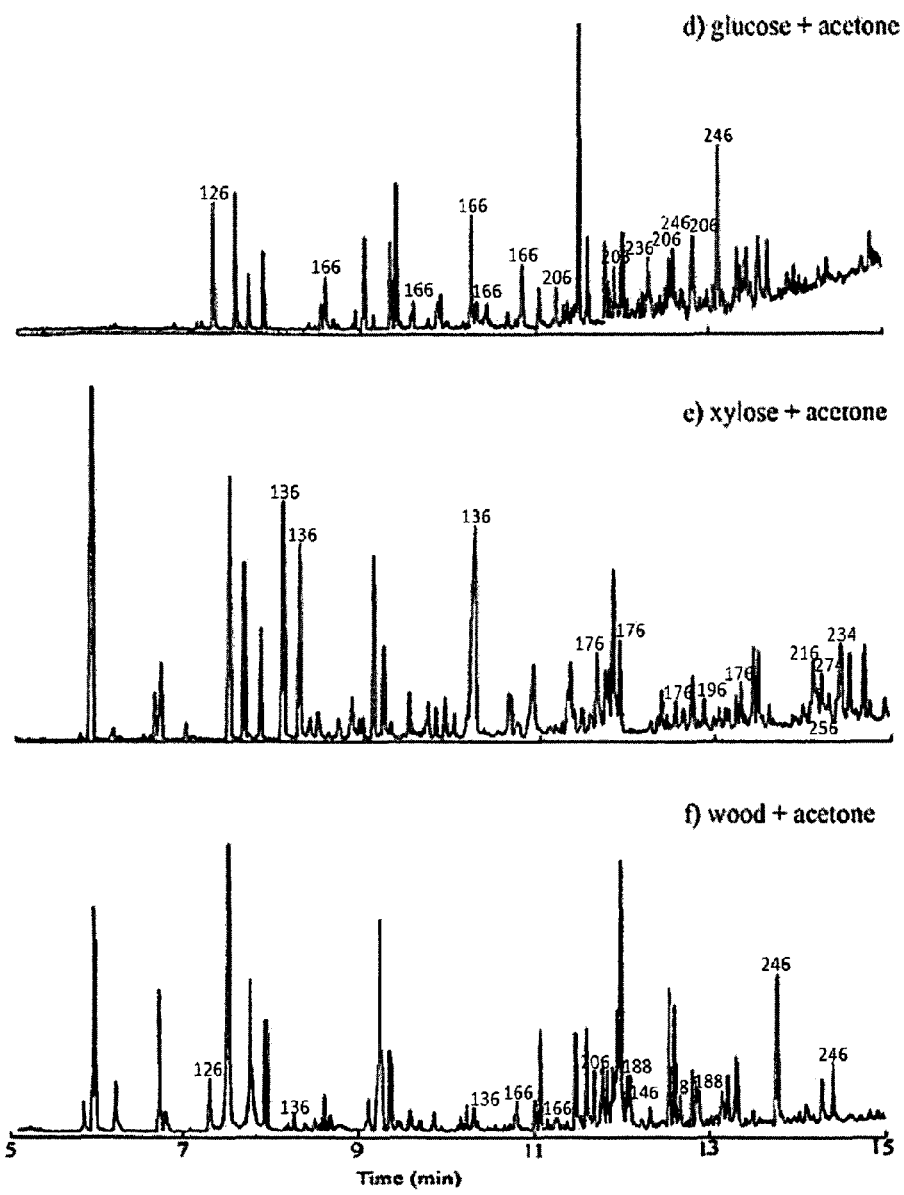
Figures 1, 9:
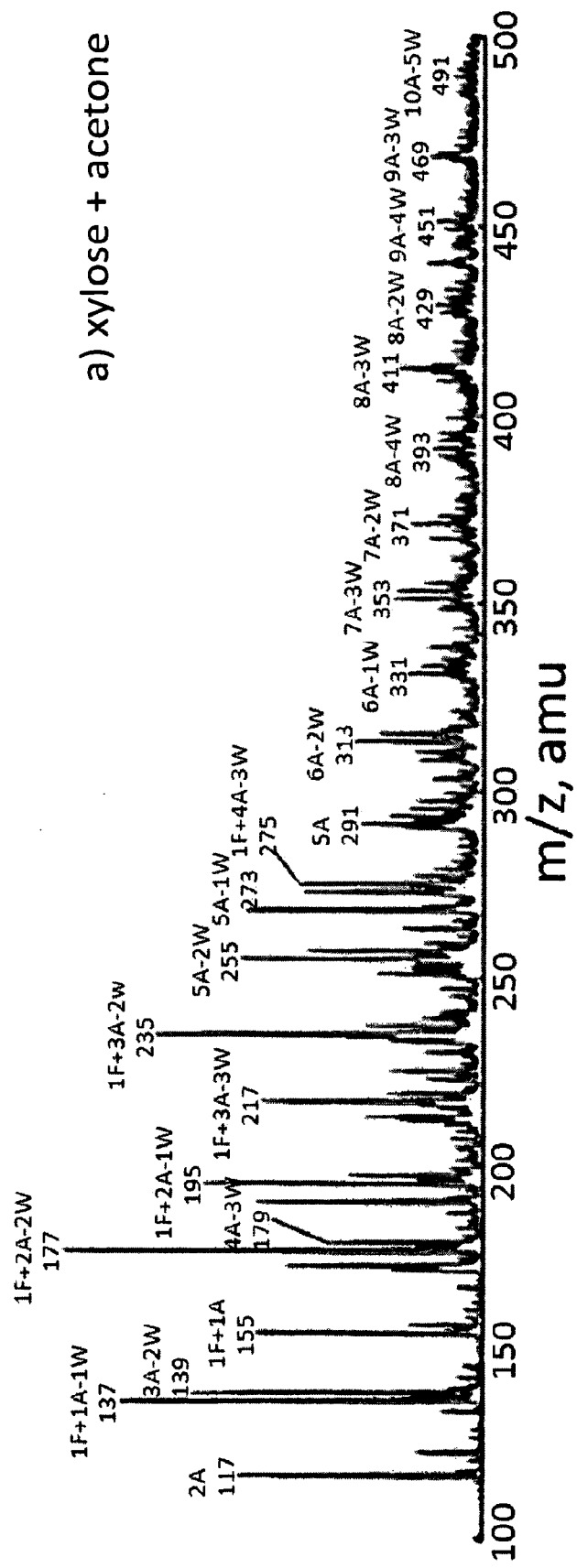
Figures 2, 9:
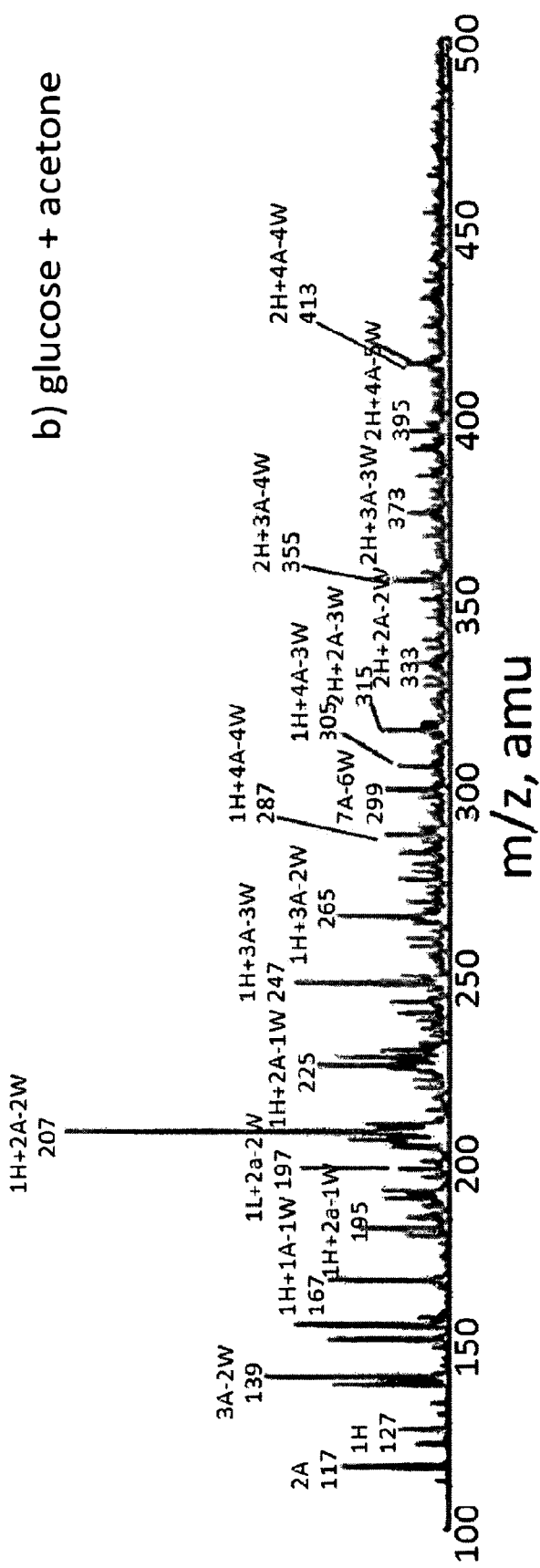
Figures 3, 9:
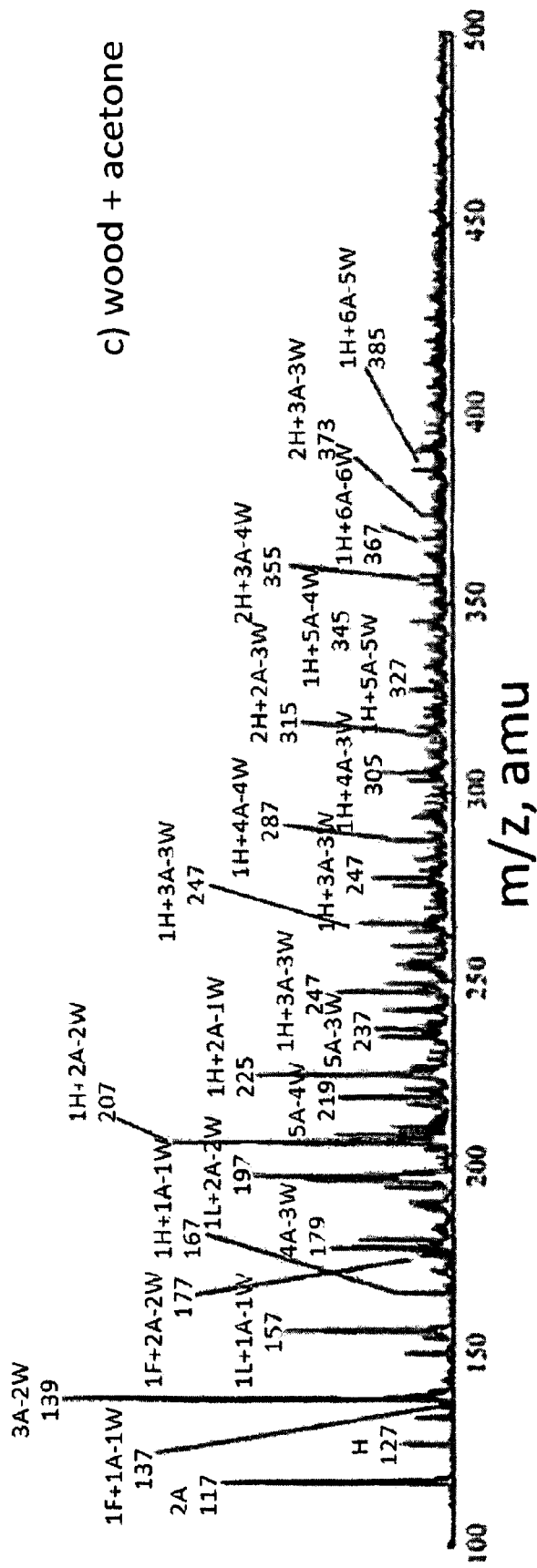

FIGS. 8 and 9, respectively, show the GC-MS (GS elution profile with time with MW associated with GC peak shown) and positive ESI-MS (mass spectrum, m/z amu) of acetone self-condensation products with peaks in black, glucose-acetone condensation products in red, xylose-acetone condensation products in blue. As expected, the molecular weight of most peaks observed agreed with the number calculated from the formula proposed above (noting that in positive ESI-MS, the m/z observed in the molecular weight plus 1, due to protonation of the species examined). The ESI-MS data verify the proposed mechanisms of condensation.

In the chromatogram of FIG. 8a, the molecular weights of acetone self-condensation products ranged from 98 to 298 amu. The former is the dehydration product of 2 acetone molecules, and the latter is the dehydration product of 7 acetone molecules. Between them, the peaks labeled 138, 178, 218, 258, and 298 amu are attributable to dehydration products of 3, 4, 5, and 6 acetone molecules, while those labeled 120, 160, 200, 240, and 280 amu are attributable to the ring structures formed from the further dehydration of compounds of 138, 178, 218, 258, and 298 amu. (See: FIG. 6 and Table 10).

FIG. 8d provides the spectrum for glucose-acetone condensation products. Molecular weight peaks ranged from 126 for HMF to 246 for HMF+3 acetones–$3H_2O$. The peaks at 166 and 206 are attributable to HMF+1 acetone–$1H_2O$ and HMF+2 acetone–$2H_2O$, respectively. (See FIG. 7 and Table 10).

For xylose-acetone condensation products, in the spectrum of FIG. 8e, 136 is furfural+1 acetone–$1H_2O$, followed by 176, 216 and 256 that are attributable to furfural+2 acetone–$2H_2O$, furfural+3 acetone–$3H_2O$, and furfural+4 acetone–$4H_2O$, respectively. Products with cyclic structure and incomplete dehydration were also observed, which were 198 (furfural+4 acetone–$5H_2O$, cyclic ring), 234 (furfural+4 acetone–$3H_2O$), and 274 (furfural+5 acetone–$4H_2O$), respectively. (See FIG. 7 and Table 10).

For spruce-acetone condensation products, only one condensation product derived from pentose (furfural-acetone) was observed with MW 136, attributable to the dehydration product of 1 acetone and 1 furfural. Peaks for hexose-derived products observed were the condensation products of 1 HMF with 1, 2, and 3 acetones. The peak labeled 84 was the condensation product of 1 HMF and 1 acetone without dehydration.

One of the two differences between the GC-MS and ESI-MS spectra was that in GC-MS peaks labeled MW 160, 200, and 188 corresponded to the cyclic products. Since these compounds are non-polar and therefore could not be protonated, no peaks for these compounds were observed in the ESI-MS spectra. This, to some extent, proved the proposed reaction pathway. Another difference was that peaks with higher m/z were observed in the ESI-MS, but they were small and not clear when m/z was above 300. For m/z below 300, most peaks were from condensation of 1 furfural with a few acetones. Most of the peaks observed with m/z above 300 were from the condensation of 2 furfural with acetone. Statistically, self-condensation of furfural should only occur with very low frequency, since the concentration of acetone was much higher than that of furfural. This is supported by the very small amount of products with molecular weight above 300.

When molecular weight was below 300, carbon number was estimated to be 1~21. Since these components had the same response to the detector, their intensity in the spectrum reflected their relative content. From FIG. 9, it can be seen that the intensity of components showed a normal distribution, statistically, which matched the reaction frequency of furfural with acetone. In this reaction, the longer the chain is, the smaller the chance of production should be. Thus, the average carbon number should be around 12, which was qualitatively given by the largest peak in ESI-MS spectrum, which was the product of 1 HMF+2 acetone.

In order to verify the proposed furfural/HMF-acetone condensation pathway, GC-MS of pure HMF and furfural as feedstock were also investigated. When 100 mg HMF reacted with 1 ml acetone, it was found that a large amount of humin formed in 30 min at 120° C. Thus loading of HMF and furfural was decreased to 10 mg and reacted at 100° C. for 30 min. The GC-MS results are shown in FIGS. 8b and 8c, respectively. Furfural only showed the peak of 1 furfural+1 acetone with MW of 136. HMF only showed the peak of 1 HMF+1 acetone product as well. These peaks verified the formulas for calculation of product MW proposed above.

Figure 10:
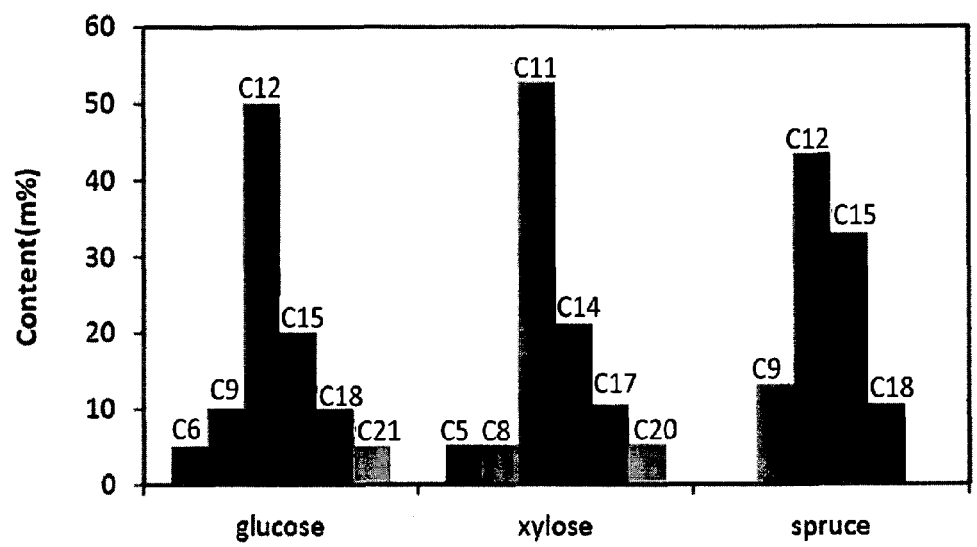
FIG. 10 is a graph showing carbon number distribution of acetone-furan adducts from glucose, xylose, and spruce wood during HDA processing.

The carbon number distribution of acetone-furan (HMF and furfural) adducts formed from glucose, xylose or spruce wood during the HDA process was estimated using positive ion ESI-MS. As shown in FIG. 10, HDA reaction with glucose which is dehydrated to HMF gave condensation products with carbon numbers between 6 and 21, indicating that 0 to 5 acetone molecules were condensed with HMF. HDA reaction with xylose which is dehydrated to furfural also gave products with carbon numbers between 5 and 20, indicating that 0 to 5 acetone molecules were condensed to furfural. In the HDA reaction of spruce, only C9-18 products were detected. In each case, products having carbon numbers of 9 to 15 (in the range of jet fuel) accounted for the largest portion (80-90%) of the total products.

Conversion yield for the HDA reaction with xylose to furfural-acetone adducts was initially estimated to be 60% based on ESI-MS spectra (of FIG. 9), assuming that intensity should reflect the relative composition of the compounds in the final products. A more complete conversion yield and selectivity estimate has been performed by 2-D NMR ($^1$H—$^{13}$C) using pyrazine as an internal standard. Sugar conversion is the percentage of sugar or polysaccharides consumed and selectivity is the percentage of the consumed sugars or polysaccharides converted to furan-acetone adducts. For HDA reactions of xylose or glucose, 93% or 96% of the sugar was consumed, respectively, and based on analysis of the NMR spectra 90% or 94%, respectively, of the consumed sugar was eventually converted to furan-acetone adducts. The reaction conditions for the data presented in Table 11 are 1 ml acetone, 300 mg LiBr, 100 µl water, 100 mg biomass, 0.25% (w/w) acid loading (based on weight of solvent), 120° C.

The overall yields of xylose or glucose to acetone-furan adducts were estimated at about 84% and 90%, respectively. A similar estimate for HDA-reaction of poplar (hardwood), gave sugar conversion of 85%, overall yield of acetone adducts of 74% and selectivity of 87%. Similar conversion, yield and selectively values were obtained for HDA-reaction of spruce, see Table 11.

Previous studies have shown that furfural-acetone adducts can be hydrodeoxygenated into hydrocarbons using a bifunctional catalyst with acid sites and metal sites. However, complete hydrodeoxygenation (HDO) of carbohydrate-based compounds into hydrocarbons consumes large amounts of hydrogen. For example, 8 moles of hydrogen is required to convert one mole of HMF-acetone adduct into one mole of C-9 hydrocarbon. As an alternative, acetone or other ketone adducts formed by HDA reaction can be converted into oxygenated hydrocarbon mixtures that are soluble in ethanol-fuel mixtures, such as the E5-E25 ethanol-gasoline mixtures, with decreased consumption of hydrogen. E15, for example, is a blend of gasoline and up to 15 vol % ethanol. E15 gasoline has higher polarity than pure gasoline because of the contribution of ethanol to polarity. Partial hydrodeoxygenation of ketone adducts products of HDA reaction reduce polarity of the product mixture so that is soluble in such ethanol/gasoline blends. In a specific example, HDA products could be converted into a E15 gasoline-soluble product on hydrogenation (6 MPa $H_2$) at 260° C. for 6 hours with THF as solvent and $Pt/Al_2O_3$—$SiO_2$ as the catalyst.

Elemental analysis (Table 12) of the product of this hydrodeoxygenation shows that the degree of unsaturation of the HDA product decreased on hydrodeoxygenation by 2-3, and that 1.4 unit of oxygen was removed for a C9 precursor unit. Reduced polarity is likely attributable to removal of oxygen and saturation of double bonds on the linear side chain because the furan ring is believed less active than the side chain. Only 2~3 moles of hydrogen were needed for partially hydrodeoxygenation of the furan precursors into E15 soluble compounds, which reduces the consumption of hydrogen from 8 to 2.5 moles.

In the many small-scale experiments above various types of lignocellulosic biomass were used as feedstock, no insoluble residue was observed at the end of reaction, implying that lignin was completely soluble in acetone. In addition, the residue after $CH_2Cl_2$ extraction was far much less than the theoretical lignin content, indicating that part of lignin was soluble in $CH_2Cl_2$. This evidence suggests that the lignin is significantly degraded during the HDA process since natural lignin is insoluble in either acetone or $CH_2Cl_2$.

Figure 11:
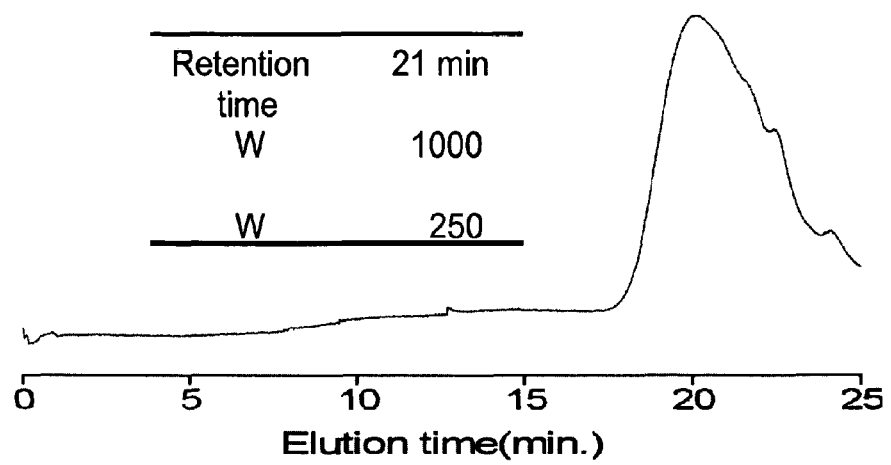
FIG. 11 is a GPC chromatograph of acetone soluble lignin.

The acetone-soluble part of lignin was investigated by GPC. As seen from FIG. 11, the weight average molecular weight of the acetone-soluble lignin was around 1,000 Da suggesting that lignin was severely degraded into small fragments during the HDA process. In other words, the acetone-soluble lignin consisted of approximately only 4~5 monomeric units. In general, natural lignin has a molecular weight of 20,000-100,000, dependent on the biomass species. Kraft pulping or organosolv pretreatment typically decreases the weight-average molecule weight of lignin to 3,000-5,000 and 2,000-4,000, respectively. Comparatively, the 1,000 MW of HDA-treated lignin was much lower than that of lignin treated by these other treatments. The low molecular weight of the acetone-soluble lignin from HAD treatment (at mild conditions, 120-140° C.) compared that of lignin treated by Kraft pulping of organosolv, suggests that there is a unique delignification mechanism involving LiBr, mineral acid and acetone. In addition, the fraction of HDA-treated lignin soluble in $CH_2Cl_2$ should have by comparison even smaller molecular weight than the acetone-soluble fraction.

To further understand lignin degradation in the HDA process, lignin samples from different sources (processes) were investigated in the presence of LiBr. Since not all lignin samples are soluble in acetone and acetone itself undergoes self-condensation, dioxane/water (9:1, v/v) was used as solvent in this study, though this solvent might not be as good as acetone for formation of free Br—. Relative amounts of acetone-soluble, $CH_2Cl_2$-soluble and insoluble fractions (weight %) of the lignin before and after the LiBr treatment were determined. The results are summarized in Table 13. As expected, dependent on the lignin source, the $CH_2Cl_2$-soluble lignin fraction increased significantly, after treatment, and the insoluble lignin fractions decreased. This indirectly indicates that lignin was further degraded by LiBr even at mild conditions (~100° C. and atmospheric pressure).

Figure 12:
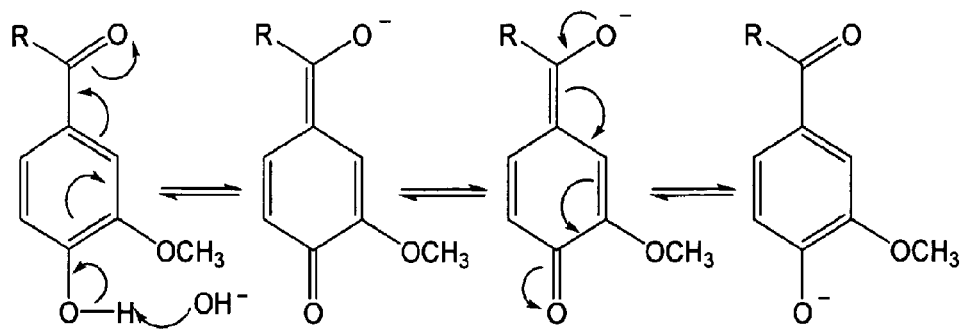
FIG. 12 is a scheme showing transformation of lignin under acidic and alkaline conditions.

To verify the cleavage of ether linkages in lignin during LiBr treatment, qualitative determination of change in amount of phenolic hydroxyl group was studied using UV differential spectra as developed by (Aulin-Erdtman 1957). By subtracting the absorption of lignin in a neutral medium from the corresponding absorption in an alkaline medium, a so-called "differential" spectrum is obtained. This subtraction excluded the absorption by non-ionized groups that are the same in neutral and in alkaline solutions. Consequently, the new spectrum depended only on the ionizable chromophores. A study using lignin model compounds established that the maxima in the differential spectra in the 250-300 nm regions is the characteristic absorption of non-conjugated lignin monomers. The maxima in 250 and 350-420 nm regions appear when a phenolic group is conjugated through the ring with a carbonyl group or with a double bond in a side chain, as illustrated in FIG. 12.

Figure 13:
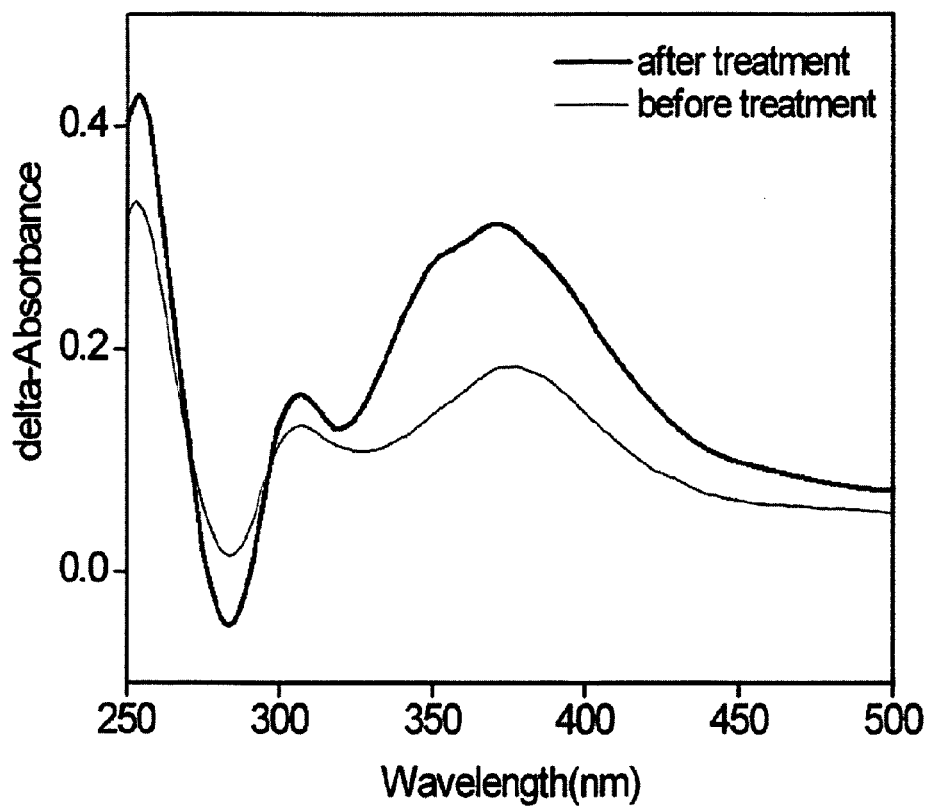
FIG. 13 are UV differential spectra of lignin before and after HDA treatment.

FIG. 13 shows the UV differential spectra of untreated and treated organosolv lignin with lignin treated by the HDA process. Qualitative comparison indicated that the amount of phenolic hydroxyl group was increased almost 2-fold after the dioxane-LiBr treatment, verifying the cleavage of ether linkages and the formation of new hydroxyl groups.

Partial hydrodeoxygenation of residual lignin from HDA process was also conducted at the same conditions as that of acetone-furan precursors as in Table 12. Elemental analysis shows that about 2 units of oxygen were removed in one lignin unit. The degree of unsaturation decreased from 4.4 to 1.4, indicating that the aromatic ring might be partially saturated in addition to saturation of the side chain. Removal of oxygen might be ascribed to hydrogenesis of methoxyl groups, loss of the hydroxyl groups on the side chains of the lignin, and the saturation of the aromatic ring in the lignin.

Figure 14:
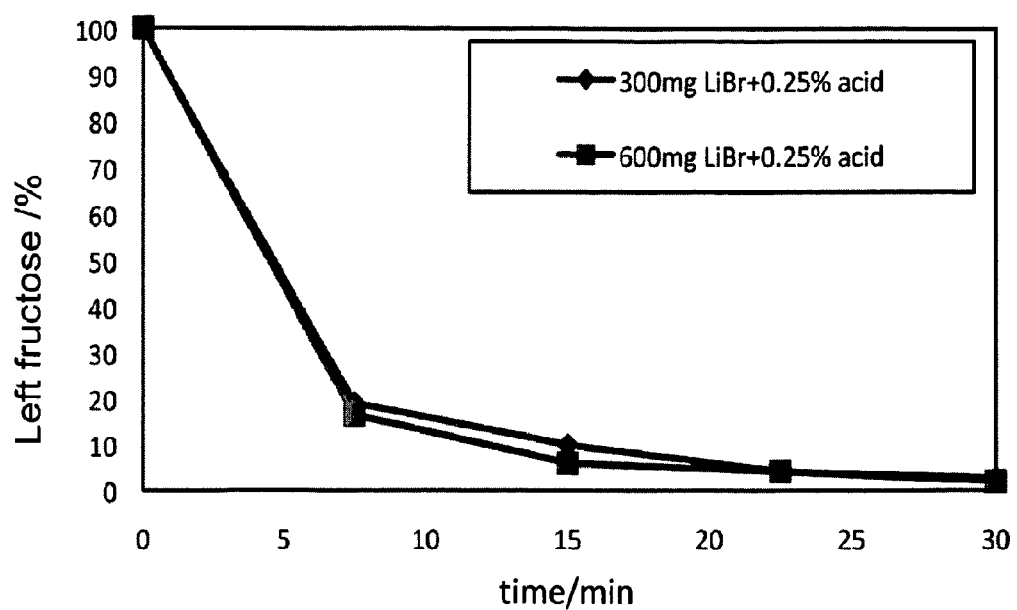
FIG. 14 is a graph of the extent of dehydration of fructose at two different LiBr concentrations with 0.25% acid at 75 C, 1 mL acetone, 100 μL water, and 100 mg fructose.

Results of experiments discussed herein (Table 2) showed that both acid and Br$^-$ played a very important role in catalyzing sugars to furfural/HMF. In order to look into the reaction mechanism, kinetic modeling of this reaction was studied by varying the dosage of acid and LiBr. It was reported (Qian, Nimlos et al. 2005; Aida, Sato et al. 2007) that six-member ring of glucose experienced a ring opening followed by a ring closing to form five-member ring of fructose as an intermediate in the dehydration process to form HMF. In order to investigate whether Br$^-$ was involved in dehydration of fructose, converting fructose to HMF under different conditions was studied. Several test experiments showed that fructose was dehydrated very quickly so that the reaction temperature was lowered down to 75° C. in 30 min to get a decent data set (FIG. 14).

According to the Arrhenius equation ($k=Ae^{-Ea/RT}$), the dehydration rate of fructose is 100 times faster than dehydration of glucose. In addition, the dosage of LiBr did not have any significant effect on dehydration of fructose. Therefore, in the all reactions involved in the dehydration of glucose to HMF, the effect of the step from fructose to HMF can be ignored. In other words, the formation of fructose intermediate from glucose is the rate-determining step where Br$^-$ and H$^+$ are both involved. In the kinetic study, the rate of glucose dehydration is affected by the concentration of both acid and LiBr. Assuming that interaction of LiBr and water doesn't have any catalytic effect on conversion of glucose to HMF and only free Br$^-$ from the interaction of acetone with LiBr is involved in formation of the intermediate, therefore as the reaction proceeds, free Br$^-$ will decrease with the increase of water from dehydration of glucose. Furthermore, since acid significantly affect the self condensation of acetone, partial acid in this reaction is used in acetone self condensation, which makes the amount of acid actually involved in glucose to HMF approximately proportional to the amount of glucose:

$$(C_{acid}=A \times C_{total\_acid} \times C_{glu}/C_{acetone}).$$

Based on these assumptions, a rate expression can be developed:

$$r_{HMF}=-r_{glu}=k_1 \times C_{glu}^2 \times C_{acid} \times C_{LiBr}$$

$$r_{LiBr}=-k_2 \times C_{LiBr} \times C_{water}$$

Figures 1, 15:
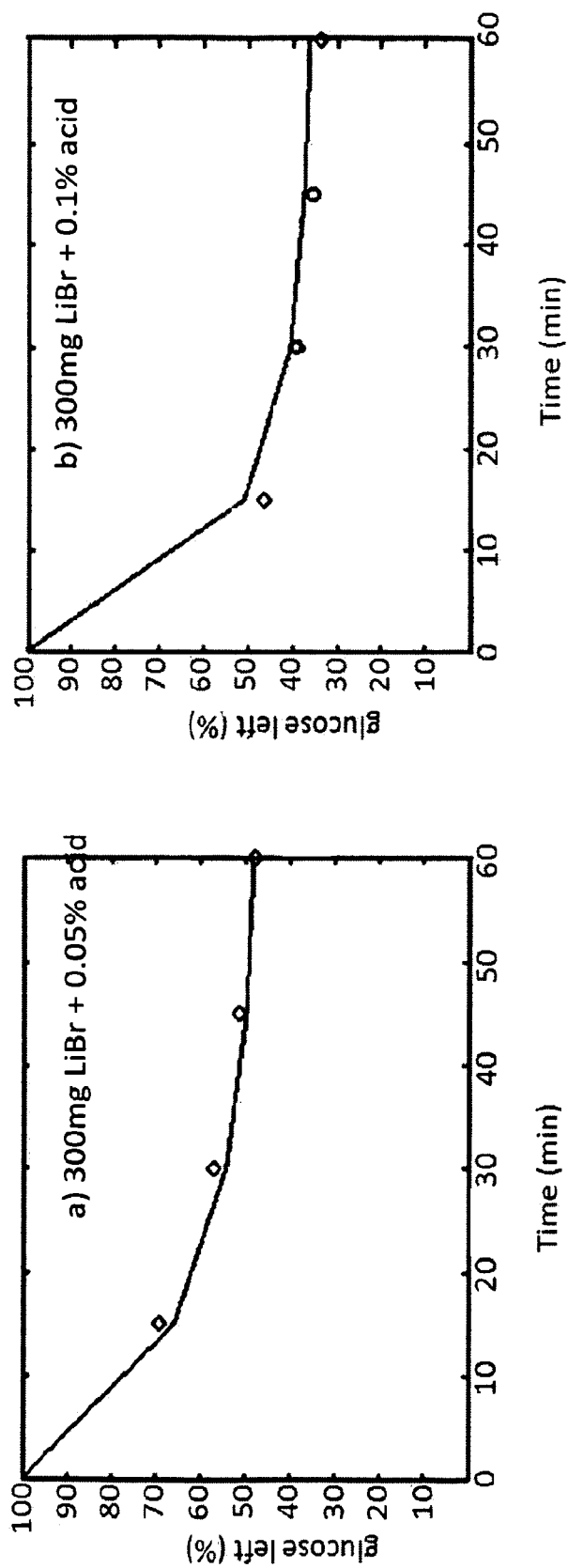
FIG. 15 shows plots of a comparison of experimental data and data predicted by kinetic modeling. a) 300 mg LiBr+0.05% acid; b) 300 mg LiBr+0.1% acid; c) 600 mg LiBr+0.05% acid; d) data plotted together. Note: (1) in a, b and c, circles represent experimental data, and the line represents modeling data. (2) In d) the line represents experimental data, and * represents modeling data. (3) reaction conditions: 100 C, 1 mL acetone, 100 μL water, 100 mg glucose.
Figures 2, 15:
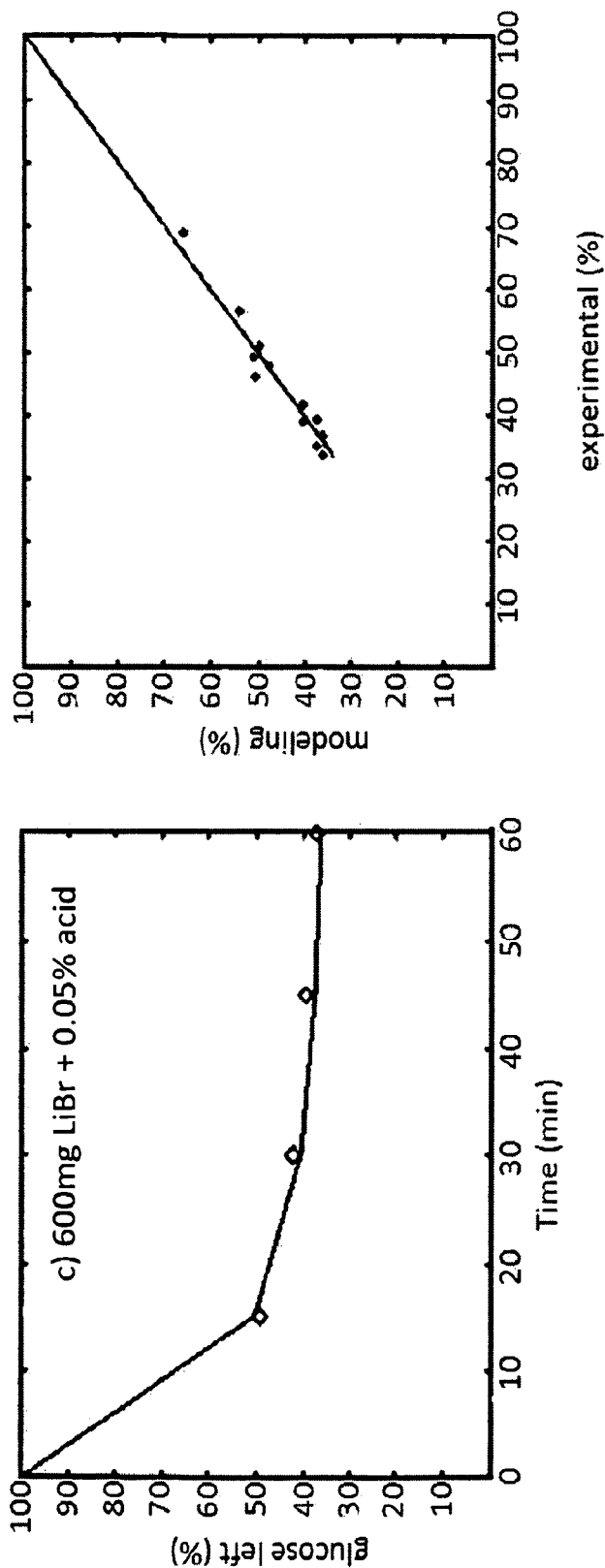
Figure 16:
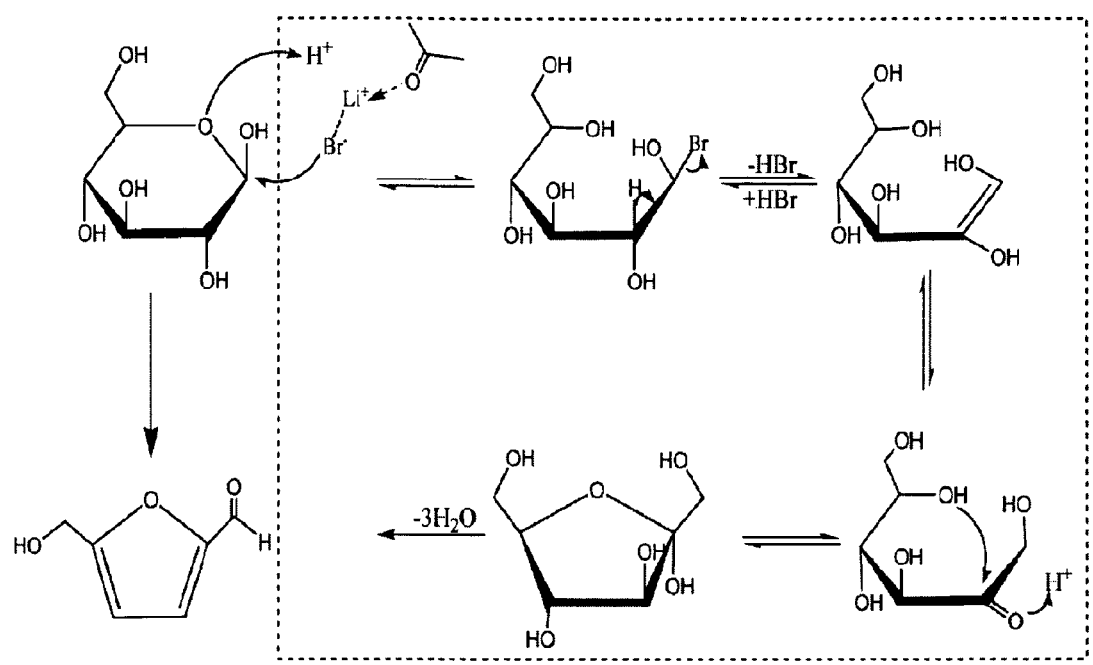
FIG. 16 is a scheme showing the molecular mechanism of transformation of glucose to HMF.
Figure 17:
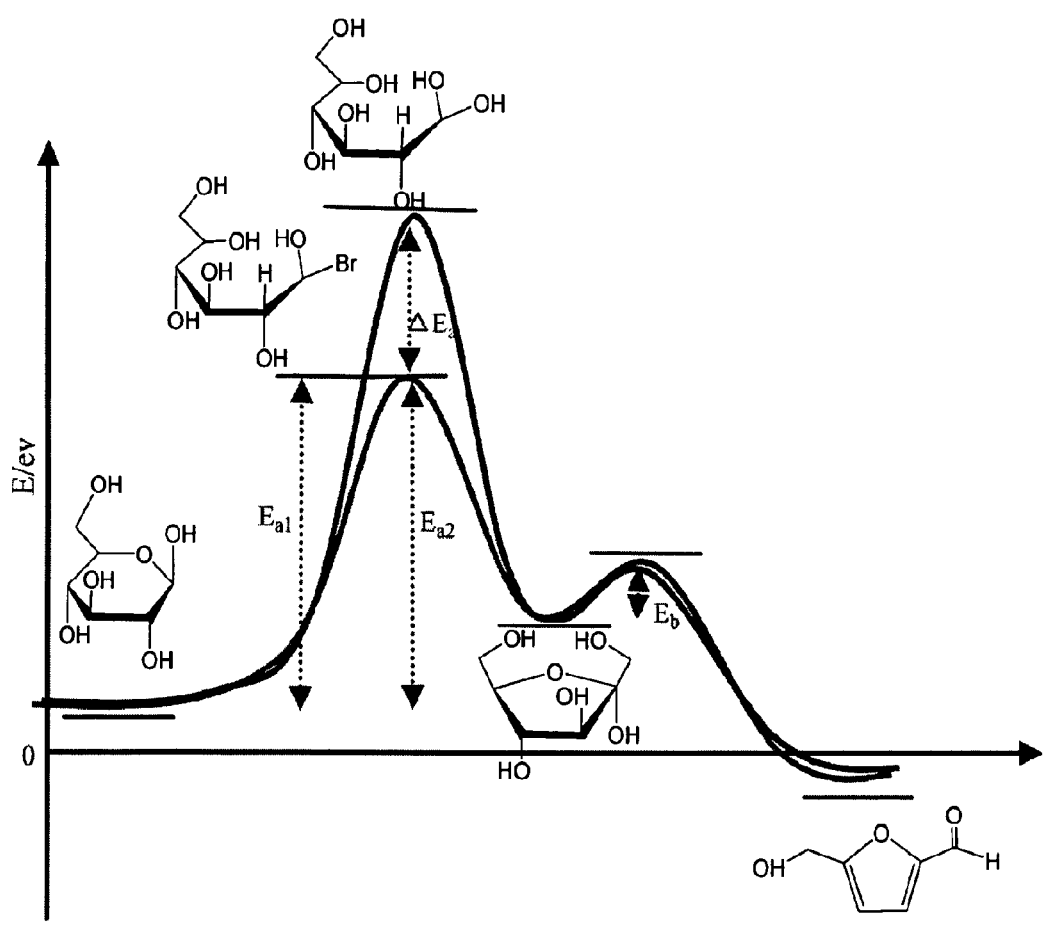
FIG. 17 is an activation energy diagram for the reaction of glucose to HMF catalyzed by Li Br.

Reaction rate constants, $k_1$ and $k_2$, were optimized through fitting modeling data to experimental data using Matlab code. Experimental results are compared to data calculated using the model for varying LiBr and acid dosages in FIG. 15 *a, b, c,* and *d*. It can be seen that the modeling data fitted the experimental data very well, which verified the assumptions and predictions above that Br$^-$ and H$^+$ are both involved in formation of intermediate with first order effect. Based on these conclusions and previous discussion of properties of the LiBr/acetone system, the molecular mechanism of glucose to HMF conversion is proposed in FIG. 16. In the situation without free Br$^-$, ring opening of glucose is only dependent on the concentration of H$^+$, which protonates O on C5 while $H_2O$ as a nucleophile attacks C1. This process proceeds very slowly since the reverse reaction of ring closing is faster than ring opening. On the other hand, when free Br$^-$ is present, the ring opening reaction of glucose is significantly promoted since Br$^-$ is a far more effective nucleophile than water. The ring opening reaction is followed by elimination of HBr to form an enol that largely decreases the reverse reaction to form six-member ring. Interpretation of this mechanism in energy diagram (FIG. 17) is that Br$^-$ attack decreases the energy barrier to form the intermediate and therefor reduces the activation energy. According to the Arrhenius equation, the reaction rate constant is significantly enhanced.

Figure 18:
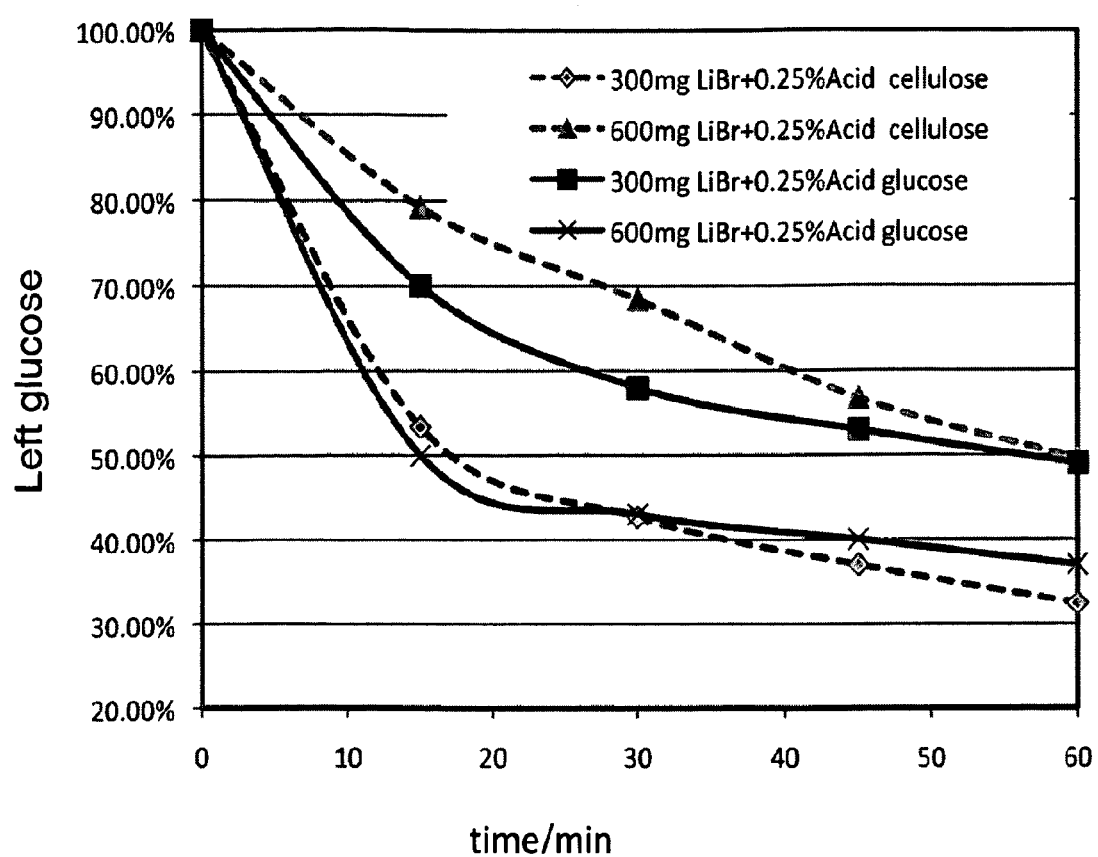
FIG. 18 is a graph comparing the reaction of amorphous cellulose or glucose to HMF derivatives at different LiBr concentrations.

The effect of cellulose hydrolysis on the rate of the whole dehydration process was also estimated through comparison of glucose and amorphous cellulose at the same reaction conditions. As shown in FIG. 18, in general, the conversion rate of cellulose is lower than that of glucose in the early stage of the reaction, and then gets close to and even higher than that of glucose. In the early stage, part of Br$^-$ is involved in cellulose hydrolysis, and therefore delays the dehydration of glucose. However, in a later stage of the reaction, hydrolysis of cellulose consumes a portion of the water, which is favorable to the dehydration of glucose. Meanwhile, less water is also favorable to the formation of more free Br$^-$ as catalyst in the reaction, as discussed above. The similar results observed for both 600 mg and 300 mg LiBr loading verified the observation.

Acetone can be readily recovered by evaporation after reaction. The residue is the mixture of products (furfural- and HMF-acetone adducts, small amount of free furfural and HMF), LiBr, water, lignin, and, if any, unreacted residual biomass or sugars. The products can be extracted using $CH_2Cl_2$, because LiBr and lignin (largely) are insoluble in CH$_2$Cl$_2$. Lignin can then be separated by filtration or centrifugation because of its insolubility in water. The residue is the aqueous LiBr solution (including HCl), which can be recycled directly or after concentration for reuse. When water/acetone (50/50) was used as the reaction solvent, titration with Ag$^+$ indicated that 97.5% the LiBr was recovered in the final LiBr solution. Washing the CH$_2$Cl$_2$ extract and the lignin fraction with water can recover an additional 1.5% LiBr, which indicates that almost all of the LiBr and HCl can be recovered and reused by simple washing and filtration or centrifugation.

When a Markush group or other grouping is used herein, all individual members of the group and all combinations and subcombinations possible of the members of the groups therein are intended to be individually included in the disclosure. Every formulation or combination of components described or exemplified herein can be used to practice the invention, unless otherwise stated.

Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination.

One of ordinary skill in the art will appreciate that synthetic methods, starting materials, reagents, purification methods, analytical methods, and reaction conditions other than those specifically exemplified herein can be employed in the practice of the invention without resort to undue experimentation. All art-known functional equivalents, of any such methods, materials and conditions are intended to be included in this invention.

Whenever a range is given in the specification, for example, a range of numbers of elements in a chemical group or moiety (e.g., a range of numbers of carbons (e.g., C1-C3), a range of any integer, a range of any number of substituents, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the broad term "comprising", particularly in a description of components of a composition or in a description of elements of a device, is intended to encompass and describe the terms "consisting essentially of" or "consisting of".

Although the description herein contains many specifics, these should not be construed as limiting the scope of the invention, but as merely providing illustrations of some of the embodiments of the invention. In particular, the examples provided herein are not intended to be limiting. Each references cited herein is incorporated by reference herein in its entirety. In the case of any inconsistency between the content of a cited reference and the disclosure herein, the disclosure of this specification is to be given priority. Some references cited herein are incorporated by reference to provide details concerning prior art processes, biomass sources, methods of pretreatment of biomass prior to HDA reaction, additional catalysts for hydrogenation and dehydration of ketone adducts and lignin, additional methods of analysis and additional uses of the ketone adducts, oxygenated ketone adducts, liquid fuels and treated lignin of this invention.

THE EXAMPLES

Materials and Methods

Varied types of biomass feedstock were used, including softwood spruce, hardwood poplar, crop residue, e.g., corn stover, energy crop, e.g., switchgrass, and paper (newspaper and print paper). After being air-dried, the biomass samples were ground to pass a 40-mesh screen using a Wiley mill. Sources and chemical composition of the biomass samples are presented in Table 1.

TABLE 1

Chemical composition of biomass materials

| Composition, %[1] | Spruce[2] | Corn Stover[2] | Poplar[2] | Switch-grass[2] | News-paper[2] | Print-paper[2] |
|---|---|---|---|---|---|---|
| Moisture | 10.00 | 4.50 | 9.56 | 9.86 | ND[3] | ND |
| Extractives | 5.00 | 15.50 | 6.32 | 16.58 | ND | ND |
| Arabinose | 0.98 | 2.71 | 0.29 | 1.93 | 0.35 | 0.19 |
| Galactose | 2.34 | 1.05 | 0.53 | 0.71 | 0.40 | 0.08 |
| Glucose | 42.03 | 35.28 | 43.45 | 29.66 | 63.20 | 71.28 |
| Xylose | 5.18 | 18.40 | 13.41 | 18.01 | 12.13 | 14.74 |
| Mannose | 10.18 | 0 | 2.34 | 0.33 | 4.86 | 3.41 |
| Total lignin | 26.88 | 16.78 | 19.42 | 15.51 | 13.08 | 3.22 |

Note:
[1]Percentage is based on air-dried materials.
[2]Spruce chips were generously provided by the Wisconsin Rapids mill of Stora Enso North America (now New Page Corporation, Miamisburg, Ohio). Corn stover was harvested at the Agricultural Experimental Station of University of Wisconsin - Madison. The poplar chips (F1 hybrid poplar, Populus nigra x P. maximowiczii) were generously provided by the USDA Forest Service, Forest Product Laboratory (Madison, WI). The switchgrass was grown and harvested at an experimental farm in Arlington, WI. Newspaper was margins from State Journal of Wisconsin. Printpaper was regular office paper (Hammermill).
[3]ND represents not detected.

A. Determination of Residual LiBr and HCl

Residual LiBr and HCl in the filtrate were determined by titration. The filtrate (1 ml) after CH$_2$Cl$_2$ extraction was diluted into 200 ml with de-ionized water. The pH of the solution was adjusted to about 7-9 by addition of 2M NaOH before titration. Recovery rate of LiBr was determined by the Mohr method (http://www.titrations.info/precipitation-titration-argentometry-chlorides-Mohr). Concentrations of Br$^-$ and Cl$^-$ were determined by titration using AgNO$_3$ with KCrO$_4$ as the indicator. The mechanism of titration is shown below.

Br$^-$+Ag$^+$→AgBr(yellow precipitate)

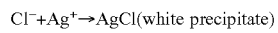
Cl$^-$+Ag$^+$→AgCl(white precipitate)

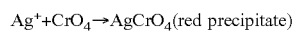
Ag$^+$+CrO$_4$→AgCrO$_4$(red precipitate)

Recovery rate (%)=$n_{Ag^-}$consumed/($n_{Br^-}$total+$n_{Cl^-}$ total)2.5·HDA

B. UV-Differential Spectra of Lignin

Phenolic hydroxyl groups in lignin were estimated by UV differential spectra. Untreated lignin or lignin treated with LiBr (10 mg), as described below, was dissolved in 10 ml dioxane/water (9:1, v/v), respectively. The lignin solutions (9 mL) were mixed with 0.1 mL of 1M NaOH or 1M HCl. Absorption spectra of the acidic and alkaline solutions of the lignin were collected with blank solvent as reference on a UV-vis spectrophotometer (Cary 50 Bio, Varian, Palo Alto, Calif.). To obtain a differential spectrum, the absorbance of the acidic solution was subtracted from the absorbance of the alkaline solution at corresponding wavelengths.

C. Determination of Lignin

Acid-insoluble lignin was determined according to National Renewable Energy Laboratory (NERL) Analytical Procedure with modifications. Acid-soluble lignin was determined with the UV method at 205 nm using an extinction coefficient of 110 L g-1 cm-1 (Dence 1992).

D. Determination of Sugars

Sugar analysis was conducted using a Dionex HPLC system (ICS-3000) equipped with integrated amperometric detector and Carbopac™ PA1 guard and analytical columns at 20° C. Eluent was provided at a rate of 0.7 ml/min, according to the following gradient: 0~25 min, 100% water; 25.1~35 min, 30% water and 70% 0.1M NaOH; 35.1~40 min, 100% water. To provide a stable baseline and detector sensitivity, 0.5 M NaOH at a rate of 0.3 ml/min was used as postcolumn eluent.

Conversion yield is the percentage of the original sugars in biomass consumed (converted) during the reaction. It was calculated from the difference in total sugars detected (using HPLC) before and after the reaction. The conversion yield is not the products yield. Consumed (converted) sugars may not be converted into target products.

E. Determination of Sugar Derivatives

Furfural, levulinic acid and 5-hydroxylmethylfurural (HMF) were analyzed using the Dionex ICS-3000 equipped with a Supelcogel C-610H column at temperature 30° C. and a UV detector at 210 nm. Eluent was 0.1% phosphoric acid at a rate of 0.7 ml/min.

F. Qualitative Analysis of Furfural- and HMF-Acetone Adducts

GC-MS was used to identify components in the products. Approximately 5 mg product was dissolved into 1 ml CH2Cl2 for GC-MS. GC-MS was performed on a GCMS-QP 2010 instrument (Shimadzu Co., Addison, Ill.) equipped with a 30 m×0.25 mm i.d., 0.25 m film, SHR5XLB capillary column. Helium was used as carrier gas. GC conditions were as follows: initial column temperature, 100° C., held for 1 min, ramped at 2° C./min to 310° C., and then hold for 4 min; injector temperature, 250° C.; split ratio, 1/20, EI mode at 0.2 kV for ionization.

G. Quantitative/Qualitative Analysis of Furfural- and HMF-Acetone Adducts

Electrospray Ionization Mass Spectrometry (ESI-MS, positive mode) was used to quantify the products on an Applied Systems 3200 QTRAP instrument. 10 mg product was dissolved in 10 ml methanol/CHCl$_3$ (1:1, v/v) to prepare 1 mg/ml product solution. 1 mg furfural-acetone was dissolved in 10 ml methanol/CHCl$_3$ (1:1, v/v) to prepare 0.1 mg/ml standard solution, which was further diluted into 0.01 mg/ml. Combining 0.5 ml the product solution and the 0.5 ml 0.1 mg/ml standard solution led to a sample with product concentration of 0.5 mg/ml and standard concentration of 0.05 mg/ml. Combining 0.5 ml the product solution and the 0.5 ml 0.01 mg/ml standard solution led to another sample with product concentration of 0.5 mg/ml and standard concentration of 0.005 mg/ml.

H. Determination of Lignin Molecular Weight

Gel permeation chromatography (GPC) was used to estimate the molecular weight of lignin. GPC was performed with a Viscotek GPCmax VE-2001 chromatograph using two columns (VARIAN 5M-POLY-008-27 and VARIAN 5M-POLY-008-32). THF (tetrahydrofuran) was used as eluent with a flow rate of 1 mL/min at 30° C. Monodispersed polystyrene standards were used for calibration.

I. Characterization of Solvent Systems (LiBr/Water and LiBr/Acetone)

Fourier Transform Infra-Red Spectroscopy (FTIR) was used to investigate the bonding changes caused by the interactions between acetone/water and LiBr. Spectra were recorded on a PerkinElmer Spectrum 100 FT-IR spectrophotometer with universal attenuated-total-reflection (ATR) sampling accessory (Waltham, Mass.).

K. Software for Kinetic Modeling

MATLAB® software (MathWorks, Natick, Mass.) was used to build up the kinetic model and optimize the kinetic parameters.

Example 1

Small-Scale HDA Treatment of Sugars and Ground Lignocellulosic Biomass

Certain amounts (see Tables 2 and 3) of LiBr and hydrochloric acid, 1 ml acetone and 100 µl water were loaded into a 15-ml vial and vortexed to mix well. To this solution 100 mg of 40 mesh biomass powder or sugar (as indicated in Tables 2 and 3) was added and the mixture was vortexed again. The vial was heated at 80-120° C. in an oil bath and stirred with a magnetic stir bar at 500 rpm for 2 hours. At the end of reaction, acetone in the mixture was carefully removed at low temperature (50° C.) using a rotary evaporator. The residue was extracted with $CH_2Cl_2$ to collect furfural-/HMF-acetone adducts products. The residue after the extraction, consisting of liquid (water+LiBr) and solid (lignin and unreacted biomass), was filtered and washed with water. Filtrate was collected for analysis of saccharides, HMF, furfural, and residual LiBr and HCl. Solid residue was redissolved in acetone and filtered. The filtrate (acetone-soluble lignin) was dried and the residue after filtration (unreacted biomass) was dried for composition analysis.

TABLE 2

Results for reaction of sugar or lignocellulosic biomass powder and acetone with LiBr as catalyst

| No. | LiBr mg | Acid % (w/w) | Feedstock (mg) | Soluble_ solid mg | Insloluble_ solid mg | Residual sugars mg | Reacted acetone mg | Sugar conversion % | A/F Ratio |
|---|---|---|---|---|---|---|---|---|---|
| 1 | 0 | 1 | 100 (Glu) | 46 | 0 | 30 | 13 | 70 | 0.6 |
| 2 | 100 | 0.25 | 100 (Glu) | 50 | 0 | 25 | 21 | 75 | 0.9 |
| 3 | 200 | 0 25 | 100 (Glu) | 64 | 0 | 21 | 25 | 79 | 1.0 |
| 4 | 300 | 0.25 | 100 (Glu) | 83 | 0 | 3 | 39 | 97 | 1.3 |
| 5 | 400 | 0.25 | 100 (Glu) | 92 | 0 | 5 | 45 | 95 | 1.5 |
| 6 | 500 | 0.25 | 100 (Glu) | 105 | 0 | 10 | 55 | 90 | 1.9 |
| 7 | 500 | 0.20 | 100 (Glu) | 99 | 0 | 10 | 51 | 90 | 1.8 |
| 8 | 500 | 0.15 | 100 (Glu) | 87 | 0 | 16 | 46 | 84 | 1.7 |
| 9 | 500 | 0.10 | 100 (Glu) | 63 | 0 | 20 | 31 | 80 | 1.2 |
| 10 | 500 | 0.05 | 100 (Glu) | 51 | 0 | 30 | 28 | 70 | 1.3 |
| 11 | 750 | 0.00 | 100 (Glu) | 43 | 0 | 36 | 4 | 64 | 0.2 |

TABLE 2-continued

Results for reaction of sugar or lignocellulosic biomass powder and acetone with LiBr as catalyst

| No. | LiBr mg | Acid % (w/w) | Feedstock (mg) | Soluble_ solid mg | Insloluble_ solid mg | Residual sugars mg | Reacted acetone mg | Sugar conversion % | A/F Ratio |
|---|---|---|---|---|---|---|---|---|---|
| 12 | 100 | 0.50 | 100 (Glu) | 67 | 0 | 26 | 34 | 74 | 1.5 |
| 13 | 200 | 0.50 | 100 (Glu) | 135 | 0 | 8 | 97 | 92 | 3.3 |
| 14 | 300 | 0.50 | 100 (Glu) | 155 | 0 | 2 | 136 | 98 | 4.4 |
| 15 | 300 | 0.25 | 100 (Ara) | 110 | 0 | 4.3 | 81 | 96 | 2.3 |
| 16 | 300 | 0.25 | 100 (Gal) | 96 | 0 | 14 | 63 | 86 | 2.3 |
| 17 | 300 | 0.25 | 100 (Man) | 93 | 0 | 11.5 | 57 | 88 | 2.1 |
| 18 | 300 | 0.25 | 100 (Xyl) | 99 | 0 | 4.5 | 68 | 96 | 1.9 |
| 19 | 300 | 0.50 | 100 (Cell) | 156 | 0 | 0 | 121 | 98 | 3.0 |
| 20 | 300 | 0.75 | 100 (Xylan) | 104 | 7 | 0 | 113 | 90 | 2.7 |
| 21 | 300 | 0.25 | 100 (Starch) | 98 | 0 | 0 | 46 | 98 | 1.3 |
| 22 | 300 | 0.5 | 100 (FP) | 141 | 0 | 0 | 92 | 99 | 2.6 |
| 23 | 300 | 2 | 100 (PP) | 50 | 2 | 0 | 34 | 95 | 1.1 |
| 24 | 300 | 1 | 100 (NP) | 113 | 8 | 0 | 53 | 96 | 2.0 |
| 25 | 300 | 0.5 | 100 (poplar) | 95 | 1 | 0 | 76 | 99 | 3.8 |
| 26 | 300 | 0.5 | 100 (CS) | 62 | 1 | 0 | 55 | 99 | 2.8 |
| 27 | 300 | 0.5 | 100 (spruce) | 87 | 1 | 0 | 72 | 99 | 3.6 |
| 28 | 300 | 0.5 | 100 (SG) | 74 | 2 | 0 | 61 | 99 | 3.5 |

Note:
(1) Other reaction conditions: 1 ml acetone, 100 µl water, 120° C., 2 hour.
(2) Acid loading, % (w/w) based on weight of solvent.
(3) Glu—glucose; Ara—arabinose; Gal—galactose; Man—mannose; Xyl—xylose; Cell—cellulose; FP—filter paper; NP—newspaper; CS—corn stover; and SG—switchgrass.
(4) Soluble solid—$CH_2Cl_2$ soluble adducts; insoluble solid—acetone-insoluble residues; residual sugars—sugars left in solution after reaction; reacted acetone—acetone consumed for condensation; sugar conversion—percentage of consumed sugar calculated from the difference between loaded and residual sugar; A/F ratio—molar ratio of consumed acetone to converted glucose.

TABLE 3

Results for hydrolysis of wood chips in acetone/LiBr in glass vials

| No. | Biomass, mg | LiBr mg | HCl % (w/w) | Soluble Solid, mg | Lignin mg | Left materials, mg | A/F Ratio |
|---|---|---|---|---|---|---|---|
| 29 | 500 spruce | 1500 | 0.5 | 375 | | 51 | 2.6 |
| 30 | 500 spruce | 1500 | 1 | 817 | 146 | 0 | 8.0 |
| 31 | 1000 spruce | 1500 | 1 | 870 | 273 | 60 | 3.2 |
| 32 | 1500 spruce | 1500 | 1 | 853 | 409 | 73 | 1.1 |

Note:
Other reaction conditions: 5 mL acetone, 200 µL water, 120° C., 2 h.

Example 2

HDA Treatment of Wood Chips with a Parr Reactor

Certain amounts (see Tables 4 and 5) of LiBr, hydrochloric acid, acetone and water were mixed in a 200-ml plastic bottle by vortexing, and then loaded to a 1-L Parr reactor with wood chips (10 g, 1×2 cm). The contents were mixed with a glass rod before closing the reactor. The reactor was heated to 120~140° C. over 30 min and held at that temperature for 1-2 hours with stirring at 500 rpm. At the end of the reaction, acetone in the mixture was carefully removed at low temperature (50° C.) using a rotary evaporator. The residue was extracted with $CH_2Cl_2$ to collect products. The residue after the extraction, consisting of liquid (water+LiBr) and solid (lignin and unreacted biomass), was filtered and washed with water. Filtrate was collected for analysis of saccharides, HMF, furfural, and residual LiBr and HCl. Solid residue was redissolved in acetone and filtered. The filtrate (acetone-soluble lignin) was dried and the residue after filtration (unreacted biomass) was dried for composition analysis.

TABLE 4

Acetone/LiBr hydrolysis of wood chips in a Parr reactor

| Acid conc. % | Residue g | Residue composition | | | Liquor | |
|---|---|---|---|---|---|---|
| | | Sugar g, (%, w/w) | Lignin g, (%, w/w) | Acid-soluble lignin g, (%, w/w) | Lignin g | Products g |
| 0.25 | 8.1 | 5.95 (98%) | 1.30 (48%) | 0.31 (11%) | 1.4 | 2.0 |
| 0.5 | 6.7 | 5.23 (83%) | 1.24 (46%) | 0.24 (8.9%) | 1.2 | 2.1 |
| 1 | 4.5 | 3.35 (53%) | 1.00 (37%) | 0.26 (9.6%) | 1.7 | 2.9 |
| 2 | 2.8 | 0.39 (6.6%) | 2.13 (79%) | 0.09 (3.3%) | 0.4 | 12.3 |

Note:
Other reaction conditions: 30 g salts, 10 g spruce chips, 90 ML acetone, 10 mL water, 120° C., 2 h.

TABLE 5

Acetone/LiBr hydrolysis of wood chips in Parr reactor with different solid/liquid ratio

| Feedstock | Acetone:water v/v | Time h | Residue g | Residue composition Sugar g (%, w/w) | Residue composition Lignin g (%, w/w) | Products g |
|---|---|---|---|---|---|---|
| Spruce | 50/50 | 1 | 3.4 | 1.35 (20%) | 2.04 (74%) | 1.5 |
|  | 50/50 | 1.5 | 3.2 | 0.64 (10%) | 2.5 (92%) | 2.4 |
|  | 25/75 | 1.5 | 5.6 | / | / |  |
|  | 10/90 | 1.5 | 6.9 | / | / |  |
| Corn stover | 50/50 | 1.5 | 2.3 | 0.7 (10%) | 1.6 (95%) | 2.7 |
| Poplar | 50/50 | 1.5 | 2.3 | 0.6 (9%) | 1.6 (80%) | 2.5 |

Note:
Other reaction conditions; 10 g salts, 10 g wood chips or corn stover, 2% acid, 140° C.

Example 3

Variations in Temperature, Time, Salt and Acid on Hydrolysis Rate of Spruce Powder The effect of increasing temperature on conversion yield of spruce powder was investigated in the range of 80-120° C. for 2 h reactions with LiBr in acetone/water is shown in Table 6, where specific reaction conditions are listed in the table. Table 7 shows the effect of increasing reaction time at 100° C. on conversion yield of spruce powder under similar reaction conditions. These results indicated that conversion yield increased with the increasing temperature; however, high conversion yield could also be achieved by extending reaction time at lower temperature.

TABLE 6

Effect of temperature on hydrolysis rate of spruce powder

| Temperature, ° C. | Conversion yield, % |
|---|---|
| 80 | 58 |
| 100 | 67 |
| 120 | 99 |

Note:
Other reaction conditions: 300 mg LiBr, 100 mL water, 1 mL acetone, 100 μL water, 100 mg spruce powder, 2 h.

TABLE 7

Effect of time on hydrolysis rate of spruce powder

| Temperature, ° C. | Conversion yield, % |
|---|---|
| 1 | 58 |
| 2 | 67 |
| 3 | 88 |
| 4 | 99 |

Note:
Other reaction conditions: 300 mg LiBr, 100 mL water, 1 mL acetone, 100 μL water, 100 mg spruce powder, 100° C.

The effect of different halide salts on conversion yield of spruce powder was investigated and the results are shown in Table 8, where other details of the reaction conditions are given. While $CaBr_2$, NaBr, LiBr and LiCl gave about the same conversion yield in the same reaction time, other metal halides tested, such as $CaCl_2$, $MgCl_2$, $ZnBr_2$ and $ZnCl_2$ and $FeBr_3$ gave somewhat lower yields. LiI, $AlCl_3$, KBr, $CuCl_2$ and $FeCl_3$ did not work under the conditions tested (data not shown).

TABLE 8

Effect of different halogen salts on hydrolysis rate of spruce powder

| Salt | Solid left, mg | Conversion yield, % |
|---|---|---|
| $CaBr_2$ | 15 | 99 |
| NaBr | 26 | 97 |
| NaBr (200 mg water) | 20 | 99 |
| LiCl (200 mg water) | 25 | 99 |
| $ZnBr_2$ | 52 | 65 |
| $FeBr_3$ | 52 | 65 |
| $MgCl_2$ | 40 | 81 |
| $CaCl_2$ | 41 | 80 |
| $ZnCl_2$ | 59 | 50 |

Note:
Other reaction conditions: 300 mg salts, 100 μL water, 1 mL acetone, 100 mg spruce powder, 0.25% (w/w) HCl (based on weight of solvent), 2 h, 120° C.

The effect of different mineral and organic acids on hydrolysis of spruce was investigated and the results are shown in Table 9, where details of the reaction conditions are listed.

TABLE 9

Effect of different acids on hydrolysis rate of spruce powder

| Salt | Solid left, mg | Conversion yield, % |
|---|---|---|
| $H_2SO_4$ | 17 | 99 |
| $HNO_3$ | 25 | 99 |
| $H_3PO_4$ | 12 | 99 |
| HCOOH | 54 | 54 |
| $CH_3COOH$ | / | / |

Note:
Other reaction conditions: 300 mg salts, 100 μL water, 1 mL acetone, 100 mg spruce powder, 0.25% (w/w) acid (based on weight of solvent), 2 h, 120° C.

Example 4

Gas Chromatography/Mass Spectrometry and of Adduct Products

GC-MS (Gas Chromatography/Mass Spectrometry) was used to identify products of HDA reaction and verify the proposed reaction pathway. FIGS. 6 and 7 illustrate the mechanisms of acetone self-condensation and condensation between furfural/HMF and acetone, respectively. Acetone condensation proceeds with loss of water to branched unsaturated ketones which in turn can cyclize with additional loss of water. The products of condensation are a mixture of the products from acetone self-condensation and the aldol-condensation between HMF/furfural and acetone of varying molecular weight. Table 10 shows the structures and molecular weights of products of these proposed mechanisms.

TABLE 10

Proposed structures of products and corresponding molecular weights

| Condensed acetone NO. | R (double bond could be added by water) | MW of HMF-acetone adduct | MW of furfural-acetone adduct |
|---|---|---|---|
| 1 | | 166, 184, | 136, 154, |
| 2 | | 206, 224, 242, | 176, 194, 212 |
| 3 | | 246, 264 | 216, 234 |
| 3(ring) | | 188, 228, 268, 308 | 158, 198, 238, 278 |
| 4 | | 286, 304 | 256, 274 |

Note:
R represents the side chain of the furan ring (see FIG. 2)

FIG. 8 show the GC-MS (GS elution profile with time with MW associated with GC peak shown) of acetone self-condensation products with peaks in black, glucose-acetone condensation products in red, xylose-acetone condensation products in blue. The GC-MS of the reaction products of pure HMF or furfural reacted with acetone were also investigated. and results are shown in FIGS. 8b and 8c, respectively. Furfural only showed the peak of 1 furfural+1 acetone with MW of 136. HMF only showed the peak of 1 HMF+1 acetone product as well. FIG. 9 shows positive ESI-MS (mass spectrum, m/z amu) of HDA reaction products of acetone with xylose (a), glucose (b) and (c) wood. As expected, the molecular weight of most peaks observed agreed with the molecular weights calculated from the mechanisms shown in FIGS. 6 and 7.

One of the two differences between the GC-MS and ESI-MS spectra was that in GC-MS peaks labeled MW 160, 200, and 188 corresponded to the cyclic products. Since these compounds are non-polar and therefore could not be protonated, no peaks for these compounds were observed in the ESI-MS spectra. Analysis of the MS data is discussed above.

Example 6

Conversion Yield and Selectivity

An estimate of conversion yield and selectivity was performed by 2-D NMR ($^1$H—$^{13}$C) using pyrazine as an internal standard (spectra not shown) and the results are shown in Table 11. Sugar conversion is the percentage of sugar or polysaccharides consumed and selectivity is the percentage of the consumed sugars or polysaccharides converted to furan-acetone adducts. The HDA reaction conditions for the data presented in Table 11 are 1 ml acetone, 300 mg LiBr, 100 μl water, 100 mg biomass, 0.25% (w/w) acid loading (based on weight of solvent), 120° C.

TABLE 11

Conversion yields for HDA reaction determined by 2-D $^1$H-$^{13}$C NMR

| Substrate | Sugar Conversion, % | Selectivity, % | Overall yield of Sugar-to-acetone adducts, % |
|---|---|---|---|
| Xyl | 93 | 90 | 83.7 |
| Glu | 96 | 94 | 90.2 |
| Poplar | 85 | 87 | 74.0 |
| Spruce | 83 | 88 | 73.0 |

HDA reaction conditions: 100 mg substrate, 300 mg LiBr, 1 mL acetone, 100 μL water, 0.25% (w/w) acid (based on weight of solvent), 120° C.

Example 7

Partial Hydrodeoxygenation of Furan-Acetone Adducts to E15 Gasoline-Soluble Mixtures Incipient wetness impregnation of $SiO_2$—$Al_2O_3$ (100 mesh, 500 m$^2$/g, purchased from Shandong Aluminum Co., Ltd) using chloroplatinic acid (purchase from Sinopharm Chemical Reagent Co., Ltd) was employed to generate $SO_2$—$Al_2O_3$ supported Pt catalyst. Following impregnation, catalyst was dried in air at 393 K for 12 hours and then calcined in air at 773 K for 5 hours. The catalyst was reduced in flowing $H_2$ (200 mL/min) at a temperature of 673 K for 2 hours. A 4% Pt/$SO_2$—$Al_2O_3$ bifunctional catalyst was used in hydrodeoxygenation experiments.

Hydrodeoxygenation of acetone adducts of the HDA-reaction was conducted in a 100 mL Parr reactor. The reactor was purged three times with $H_2$ flow and then pressurized to 6 MPa with $H_2$. The reaction was conducted at 260° C. with stirring speed of 750 rpm. Temperature was ramped to 260° C. in 1 hour and reaction was continued until a desired degree of hydrodeoxygenation was achieved as assessed by solubility properties of the product, degree of oxygenation of the product mixture and/or degree of unsaturation of the product mixture. Solubility of the hydrodeoxygenation product can, for example, be assessed in various ethanol-fuel blends, including common blends E5, E10, E15 and E25 (containing a maximum of 5, 10, 15 or 25 vol % ethanol, respectively). The degree of oxygenation and the degree of saturation of product mixtures can be determined using elemental analysis. Elemental analysis can, for example be conducted using an elemental analyzer such as the Vario EL cube (Elementar Analysensysteme GmbH, Hanau, Germany). Results of elemental analysis of the reaction products of HDA-reaction of corn stover at 120° C. with 0.5% acid before and after hydrodeoxygenation as described above for 6 hours are presented in Table 12.

TABLE 12

Elemental composition of adducts and lignin before and after hydrodeoxygenation

| biomass[a] | Reaction condition | Formula | Formula adapted to C9 | Unsaturation degree |
|---|---|---|---|---|
| Furan-adducts | Before hydrogenation | $C_{4.7}H_{5.9}O_{2.2}$ | $C_{9.0}H_{11.3}O_{4.2}$ | 4.35 |
|  | After hydrogenation | $C_{5.1}H_{9.2}O_{1.6}$ | $C_{4.7}H_{16.1}O_{2.8}$ | 1.95 |
| Separated lignin | Before hydrogenation | $C_{4.6}H_{5.7}O_{2.3}$ | $C_{4.7}H_{11.2}O_{4.5}$ | 4.40 |
|  | After hydrogenation | $C_{5.2}H_{10}O_{1.5}$ | $C_{4.7}H_{17.3}O_{2.6}$ | 1.35 |

[a]Biomass was corn stover (100 mg) treated with HDA process at 120° C., with 0.5% (w/w) acid, 300 mg LiBr, solvent acetone (1 mL)/water (100 µL).

Example 8

Hydrodeoxygenation of Lignin

Residual lignin from HDA-reaction of corn stover at 120° C. with 0.5% acid was subjected to partial hydrodeoxygenation as described in Example 3 (for 6 hours). Results of elemental analysis of lignin before and after hydrodeoxygenation are presented in Table 12.

Example 4

HDA Treatment of Isolated Lignin

LiBr (2 g) was dissolved in 10 ml dioxane/water (9:1, v/v) solution. To this solution 1 g lignin (lignin type/source is listed in Table 13) was added and mixed by vortexing. The mixture was transferred into a 100-ml flask equipped with a condenser and refluxed for 2 h. After the reaction, solvent was removed using a rotary evaporator. Solid residue was extracted with $CH_2Cl_2$ followed by acetone to determine the content of $CH_2Cl_2$-soluble lignin and acetone-soluble lignin. The residue after extractions was unreacted lignin.

TABLE 13

Decomposition of lignin in dioxane/LiBr

| | Before treatment, % | | | After treatment, % | | |
|---|---|---|---|---|---|---|
| | Insoluble | Acetone-soluble | $CH_2Cl_2$-soluble | Insoluble | Acetone-soluble | $CH_2Cl_2$-soluble |
| AA lignin | 0 | 90 | 10 | 0 | 50 | 50 |
| Ethanol lignin | 0 | 61 | 39 | 0 | 30 | 50 |
| Hydrolytic lignin | 50 | 50 | 0 | 27 | 43 | 30 |
| Kraft lignin | 62 | 18 | 14 | 1 | 60 | 39 |

Note:
AA lignin is lignin from acetic acid pretreatment; Ethanol lignin is lignin from organosolv pretreatment; hydrolytic lignin is acid hydrolysis lignin from bagasse from Sigma-Aldrich; Kraft lignin is softwood Kraft lignin from Westvaco.

REFERENCES

Aulin-Erdtman, G (1957). "Spectrographic contributions to lignin chemistry. VII. The ultra-violet absorption and ionization $\Delta\epsilon$-curves of some phenols," Svensk Papperstidn. 60(18): 671-681

Aida, T. M., Y. Sato, et al. (2007). "Dehydration Of D-glucose in high temperature water at pressures up to 80 MPa." Journal of Supercritical Fluids 40(3): 381-388.

Amarasekara, A. S., L. D. Williams, et al. (2008). "Mechanism of the dehydration of D-fructose to 5-hydroxymethylfurfural in dimethyl sulfoxide at 150 degrees C.: an NMR study." Carbohydrate Research 343(18): 3021-3024.

C. J. Barrett, J. N. Chheda, G. W. Huber, J. A. Dumesic, (2006) Appl. Catal. B 66-111.

Binder, J. B. and R. T. Raines (2009). "Simple Chemical Transformation of Lignocellulosic Biomass into Furans for Fuels and Chemicals." Journal of the American Chemical Society 131(5): 1979-1985.

Chheda, J. N., G. W. Huber, et al. (2007). "Liquid-phase catalytic processing of biomass-derived oxygenated hydrocarbons to fuels and chemicals." Angewandte Chemie-International Edition 46(38): 7164-7183.

Chheda, J. N. and J. A. Dumesic (2007) "An overview of dehydration, aldol-condensation and hydrogenation processes for production of liquid alkanes from biomass-derived carbohydrates." Catalysis Today 123 59-70

Demirbas, A. (2005). "Bioethanol from cellulosic materials: A renewable motor fuel from biomass." Energy Sources 27(4): 327-337.

Demirbas, M. F. (2009). "Biorefineries for biofuel upgrading: A critical review." Applied Energy 86: S151-S161.

Elliott, D. C. and G. F. Schiefelbein (1989). "Liquid-Hydrocarbon Fuels from Biomass." Abstracts of Papers of the American Chemical Society 198: 55-Fuel.

Hill, J. (2007). "Environmental costs and benefits of transportation biofuel production from food and lignocellulose-based energy crops. A review." Agronomy for Sustainable Development 27(1): 1-12.

Huber, G. W., R. D. Cortright, et al. (2004). "Renewable alkanes by aqueous-phase reforming of biomass-derived oxygenates." Angewandte Chemie-International Edition 43(12): 1549-1551.

G. W. Huber, J. N. Chheda, C. J. Barrett, J. A. Dumesic, (2005) Science, 308, 1446.

Huber, G. W. and J. A. Dumesic (2006). "An overview of aqueous-phase catalytic processes for production of hydrogen and alkanes in a biorefinery." Catalysis Today 111(1-2): 119-132.

Marshall, A. G. and R. P. Rodgers (2008). "Petroleomics: Chemistry of the underworld." Proceedings of the National Academy of Sciences of the United States of America 105(47): 18090-18095.

Pfaff, K.-p. M., DE), Paust, Joachim (Neuhofen, DE), Hartmann, Horst (Boehl-Iggelheim, DE) (1987). Preparation of sugar ketals. United States, BASF Aktiengesellschaft (Ludwigshafen, DE).

Qian, X. H., M. R. Nimlos, et al. (2005). "Acidic sugar degradation pathways." Applied Biochemistry and Biotechnology 121: 989-997.

Roman-Leshkov, Y., J. N. Chheda, et al. (2006). "Phase modifiers promote efficient production of hydroxymethylfurfural from fructose." Science 312(5782): 1933-1937.

Rowe, R., J. Chapman, et al. (2008). "A systematic review of life cycle assessments of bioenergy chains for heat, power and liquid transportation fuel." Comparative Biochemistry and Physiology a—Molecular & Integrative Physiology 150(3): S182-S182.

Smith, A. M. (2008). "Prospects for increasing starch and sucrose yields for bioethanol production." Plant Journal 54(4): 546-558.

Vandam, H. E., A. P. G. Kieboom, et al. (1986). "The Conversion of Fructose and Glucose in Acidic Media—Formation of Hydroxymethylfurfural." Starch-Starke 38(3): 95-101.

West, R. M., E. L. Kunkes, et al. (2009). "Catalytic conversion of biomass-derived carbohydrates to fuels and chemicals by formation and upgrading of mono-functional hydrocarbon intermediates." Catalysis Today 147 (2): 115-125.

Yoon, S. H., S. Y. Ha, et al. (2009). "Effect of bioethanol as an alternative fuel on the emissions reduction characteristics and combustion stability in a spark ignition engine." Proceedings of the Institution of Mechanical Engineers Part D—Journal of Automobile Engineering 223(D7): 941-951.

Zhao, H. B., J. E. Holladay, et al. (2007). "Metal chlorides in ionic liquid solvents convert sugars to 5-hydroxymethylfurfural." Science 316(5831): 1597-1600.

Dence, C. W., 1992. The determination of lignin. In: Dence, C. W. (Ed.), Methods in lignin chemistry. Springer-Verlag, Berlin, pp. 33.

Kubo, S, and J. F. Kadla, Lignin-based carbon fibers: Effect of synthetic polymer blending on fiber properties. Journal of Polymers and the Environment, 2005. 13(2): p. 97-105.

Kubo, S, and J. F. Kadla, Poly(ethylene oxide)/organosolv lignin blends: Relationship between thermal properties, chemical structure, and blend behavior. Macromolecules, 2004. 37(18): p. 6904-6911.

Lora, J. H. and W. G. Glasser, Recent industrial applications of lignin: A sustainable alternative to nonrenewable materials. Journal of Polymers and the Environment, 2002. 10(1-2): p. 39-48.

The invention claimed is:

1. A method for making a hydrocarbon fuel which comprises the steps of:
    (a) converting a feedstock containing monosaccharides, oligosaccharides, polysaccharides or a mixture thereof with one or more ketones in the presence of a bromide or chloride salt, mineral acid or formic acid and water to furfural-ketone adducts, hydroxymethylfurfural (HMF)-ketone adducts or both in a single step by reacting the feedstock with one or more ketones in the presence of a bromide or chloride salt, mineral acid or formic acid and water; and
    (b) at least partially hydrogenating and dehydrating the ketone adducts to form hydrocarbons or oxygenated hydrocarbons, wherein the bromide or chloride salt is selected from the group consisting of $CaBr_2$, $NaBr$, $LiBr$, $LiCl$, $CaCl_2$, $MgCl_2$, $ZnBr_2$, $ZnCl_2$ and $FeBr_3$.

2. The method of claim 1 wherein the one or more ketones is acetone.

3. The method of claim 1 wherein the bromide or chloride salt is lithium bromide or lithium chloride.

4. The method of claim 1 wherein-step (a) is conducted at a temperature from 85 to 160° C.

5. The method of claim 1 wherein the volume ratio of ketone to water ranges from 20:1 to 5:1.

6. The method of claim 1 wherein the weight ratio of salt to feedstock ranges from 1:1 to 4:1.

7. The method of claim 1 wherein the weight % of acid added to the reaction mixture based on total weight of ketone and water ranges from 0.25 to 2 wt %.

8. The method of claim 1 wherein feedstock loading ranges from about 1% wt/volume to about 50% wt/volume ketone and water.

9. The method of claim 1 wherein the feedstock is biomass.

10. The method of claim 1 wherein the feedstock contains lignin.

11. The method of claim 10 wherein at least a portion of the lignin is solubilized in the ketone.

12. The method of claim 11 further comprising the step(s) of:
    (c) separating the lignin portion solubilized in the ketone from ketone adducts; or
    (d) separating the lignin portion solubilized in the ketone from unreacted; biomass; or
    (e) both steps (c) and step (d).

13. The method of claim 1 further comprising the step of hydrogenating the ketone adducts, such that the resulting product contains less than 5% by weight oxygen.

14. The method of claim 1 further comprising a step of partially hydrogenating and dehydrating the ketone adducts, such that the resulting product contains from 30-20% by weight oxygen.

15. The method of claim 1 wherein the bromide or chloride salt is LiBr and the ketone is acetone.

16. The method of claim 14 wherein the ketone adducts are hydrogenated and dehydrated in the presence of Pt or Pd supported on $SiO_2$—$Al_2O_3$.

17. A method for depolymerizing lignin which comprises the step of contacting biomass containing lignin with one or more ketones in the presence of a bromide or chloride salt, mineral acid or formic acid and water at a temperature ranging from 85 to 160° C., wherein the bromide or chloride salt is selected from the group consisting of $CaBr_2$, $NaBr$, $LiBr$, $LiCl$, $CaCl_2$, $MgCl_2$, $ZnBr_2$, $ZnCl_2$ and $FeBr_3$.

18. The method of claim 17 wherein the bromide or chloride salt is LiBr and the ketone is acetone.

19. A method for solubilizing at least a portion of the lignin in biomass in a ketone which comprises the step of contacting the biomass containing lignin with one or more ketones in the presence of a bromide or chloride salt, mineral acid or formic acid and water at a temperature ranging from 85 to 160° C., wherein the bromide or chloride salt is selected from the group consisting of $CaBr_2$, NaBr, LiBr, LiCl, $CaCl_2$, $MgCl_2$, $ZnBr_2$, $ZnCl_2$ and $FeBr_3$.

20. The method of claim 19 wherein the bromide or chloride salt is LiBr and the ketone is acetone.

21. The method of claim 1 wherein the bromide or chloride salt is selected from $CaBr_2$, NaBr, LiBr, or LiCl.

22. The method of claim 1 wherein the ketone and added water form one phase.

23. The method of claim 1 wherein the ketone is water-miscible at reaction temperature.

24. A method for making a hydrocarbon fuel of claim 1 consisting of the steps of:
    (a) converting a feedstock containing monosaccharides, oligosaccharides, polysaccharides or a mixture thereof with one or more ketones in the presence of a bromide or chloride salt, mineral acid or formic acid and water to furfural-ketone adducts, hydroxymethylfurfural (HMF)-ketone adducts or both by reacting the feedstock with one or more ketones in the presence of a bromide or chloride salt, mineral acid or formic acid and water; and
    (b) at least partially hydrogenating and dehydrating the ketone adducts to form hydrocarbons or oxygenated hydrocarbons, wherein the bromide or chloride salt is selected from the group consisting of $CaBr_2$, NaBr, LiBr, LiCl, $CaCl_2$, $MgCl_2$, $ZnBr_2$, $ZnCl_2$ and $FeBr_3$.

* * * * *

UNITED STATES PATENT AND TRADEMARK OFFICE
CERTIFICATE OF CORRECTION

PATENT NO. : 9,487,712 B2
APPLICATION NO. : 13/883755
DATED : November 8, 2016
INVENTOR(S) : Li Shuai It is certified that error appears in the above-identified patent and that said Letters Patent is hereby corrected as shown below:

In the Claims

At Column 32 Line 10 (Claim 1), at Column 33 Line 17 (Claim 24), and at Column 33 Line 21 (Claim 24), replace "with one or more ketones" with --with the one or more ketones--.

At Column 32 Line 28 (Claim 11), at Column 32 Line 40 (Claim 12), at Column 32 Line 42 (Claim 12), at Column 32 Line 53 (Claim 15), at Column 32 Line 64 (Claim 18), at Column 33 Line 10 (Claim 22), and at Column 33 Line 12 (Claim 23), replace "the ketone" with --the one or more ketones--.

At Column 32 Line 44 (Claim 12), replace "unreacted; biomass;" with --unreacted biomass;--.

Signed and Sealed this
Eighteenth Day of July, 2017

Joseph Matal
*Performing the Functions and Duties of the
Under Secretary of Commerce for Intellectual Property and
Director of the United States Patent and Trademark Office*